United States Patent
Choi et al.

(10) Patent No.: US 10,382,085 B2
(45) Date of Patent: *Aug. 13, 2019

(54) ANALOG SELF-INTERFERENCE CANCELLATION SYSTEMS FOR CMTS

(71) Applicant: Kumu Networks, Inc., Sunnyvale, CA (US)

(72) Inventors: Jung-Il Choi, Saratoga, CA (US); Wilhelm Steffen Hahn, Sunnyvale, CA (US); Mayank Jain, San Jose, CA (US)

(73) Assignee: Kumu Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/230,077

(22) Filed: Dec. 21, 2018

(65) Prior Publication Data

US 2019/0149186 A1     May 16, 2019

Related U.S. Application Data

(63) Continuation of application No. 16/052,458, filed on Aug. 1, 2018, now Pat. No. 10,200,076.

(Continued)

(51) Int. Cl.
*H04B 1/44* (2006.01)
*H04B 1/525* (2015.01)
(Continued)

(52) U.S. Cl.
CPC ............... *H04B 1/44* (2013.01); *H04B 1/525* (2013.01); *H04L 5/14* (2013.01); *H01Q 1/246* (2013.01);
(Continued)

(58) Field of Classification Search
CPC ........ H01Q 1/246; H01Q 21/24; H01Q 25/00; H04L 27/38; H04W 24/02; H04B 7/08; H04B 1/44
(Continued)

(56) References Cited

U.S. PATENT DOCUMENTS 3,922,617 A    11/1975   Denniston et al.
4,321,624 A    3/1982   Gibson et al.
(Continued)

FOREIGN PATENT DOCUMENTS

EP         0755141 A3    10/1998
EP         1959625 B1     2/2009
(Continued)

OTHER PUBLICATIONS

Bharadia et al., "Full Duplex Radios" SIGOMM, Aug. 12-16, 2013, Hong Kong, China, Copyright 2013 ACM 978-1-4503-2056-6/6/13/08, 12 pages.

(Continued)

*Primary Examiner* — Leila Malek
(74) *Attorney, Agent, or Firm* — Jeffrey Schox; Thomas Gwinn

(57) ABSTRACT

A system for wired analog self-interference cancellation includes a coarse delayer that delays a sampled RF transmit signal by a first delay amount; a frequency downconverter that downconverts the sampled RF transmit signal to IF; a first canceller tap group comprising a first per-tap-group delayer, a first sampling coupler, a first per-tap delayer, and first and second analog vector modulators that generates an IF self-interference cancellation signal; a frequency upconverter that upconverts the IF self-interference cancellation signal to RF; and a receive coupler that combines the RF self-interference cancellation signal with the RF receive signal, reducing self-interference.

20 Claims, 14 Drawing Sheets

Related U.S. Application Data

(60) Provisional application No. 62/634,340, filed on Feb. 23, 2018, provisional application No. 62/539,716, filed on Aug. 1, 2017.

(51) Int. Cl.
  *H04L 5/14* (2006.01)
  *H01Q 25/00* (2006.01)
  *H04L 27/38* (2006.01)
  *H01Q 21/24* (2006.01)
  *H01Q 1/24* (2006.01)

(52) U.S. Cl.
  CPC ............ *H01Q 21/24* (2013.01); *H01Q 25/00* (2013.01); *H04L 27/38* (2013.01)

(58) Field of Classification Search
  USPC ........................................................ 375/285
  See application file for complete search history.

(56) References Cited

U.S. PATENT DOCUMENTS

| | | | |
|---|---|---|---|
| 4,952,193 | A | 8/1990 | Talwar |
| 5,212,827 | A | 5/1993 | Meszko et al. |
| 5,691,978 | A | 11/1997 | Kenworthy |
| 5,734,967 | A | 3/1998 | Kotzin et al. |
| 5,790,658 | A | 8/1998 | Yip et al. |
| 5,818,385 | A | 10/1998 | Bartholomew |
| 5,930,301 | A | 7/1999 | Chester et al. |
| 6,215,812 | B1 | 4/2001 | Young et al. |
| 6,240,150 | B1 | 5/2001 | Darveau et al. |
| 6,411,250 | B1 | 6/2002 | Oswald et al. |
| 6,539,204 | B1 | 3/2003 | Marsh et al. |
| 6,567,649 | B2 | 5/2003 | Souissi |
| 6,580,771 | B2 | 6/2003 | Kenney |
| 6,639,551 | B2 | 10/2003 | Li et al. |
| 6,657,950 | B1 | 12/2003 | Jones et al. |
| 6,686,879 | B2 | 2/2004 | Shattil |
| 6,725,017 | B2 | 4/2004 | Blount et al. |
| 6,907,093 | B2 | 6/2005 | Blount et al. |
| 6,915,112 | B1 | 7/2005 | Sutton et al. |
| 6,965,657 | B1 | 11/2005 | Rezvani et al. |
| 6,985,705 | B2 | 1/2006 | Shohara |
| 7,057,472 | B2 | 6/2006 | Fukamachi et al. |
| 7,110,381 | B1 | 9/2006 | Osullivan et al. |
| 7,139,543 | B2 | 11/2006 | Shah |
| 7,177,341 | B2 | 2/2007 | McCorkle |
| 7,228,104 | B2 | 6/2007 | Collins et al. |
| 7,266,358 | B2 | 9/2007 | Hillstrom |
| 7,302,024 | B2 | 11/2007 | Arambepola |
| 7,336,128 | B2 | 2/2008 | Suzuki et al. |
| 7,336,940 | B2 | 2/2008 | Smithson |
| 7,348,844 | B2 | 3/2008 | Jaenecke |
| 7,349,505 | B2 | 3/2008 | Blount et al. |
| 7,362,257 | B2 | 4/2008 | Bruzzone et al. |
| 7,372,420 | B1 | 5/2008 | Osterhues et al. |
| 7,397,843 | B2 | 7/2008 | Grant et al. |
| 7,426,242 | B2 | 9/2008 | Thesling |
| 7,508,898 | B2 | 3/2009 | Cyr et al. |
| 7,509,100 | B2 | 3/2009 | Toncich |
| 7,706,755 | B2 | 4/2010 | Muhammad et al. |
| 7,733,813 | B2 | 6/2010 | Shin et al. |
| 7,773,759 | B2 | 8/2010 | Alves et al. |
| 7,773,950 | B2 | 8/2010 | Wang et al. |
| 7,778,611 | B2 | 8/2010 | Asai et al. |
| 7,869,527 | B2 | 1/2011 | Vetter et al. |
| 7,948,878 | B2 | 5/2011 | Briscoe et al. |
| 7,962,170 | B2 | 6/2011 | Axness et al. |
| 7,987,363 | B2 | 7/2011 | Chauncey et al. |
| 7,999,715 | B2 | 8/2011 | Yamaki et al. |
| 8,005,235 | B2 | 8/2011 | Rebandt et al. |
| 8,023,438 | B2 | 9/2011 | Kangasmaa et al. |
| 8,027,642 | B2 | 9/2011 | Proctor et al. |
| 8,031,744 | B2 | 10/2011 | Radunovic et al. |
| 8,032,183 | B2 | 10/2011 | Rudrapatna |
| 8,036,606 | B2 | 10/2011 | Kenington |
| 8,055,235 | B1 | 11/2011 | Gupta et al. |
| 8,060,803 | B2 | 11/2011 | Kim |
| 8,081,695 | B2 | 12/2011 | Chrabieh et al. |
| 8,085,831 | B2 | 12/2011 | Teague |
| 8,086,191 | B2 | 12/2011 | Fukuda et al. |
| 8,090,320 | B2 | 1/2012 | Dent et al. |
| 8,155,046 | B2 | 4/2012 | Jung et al. |
| 8,155,595 | B2 | 4/2012 | Sahin et al. |
| 8,160,176 | B2 | 4/2012 | Dent et al. |
| 8,175,535 | B2 | 5/2012 | Mu |
| 8,179,990 | B2 | 5/2012 | Orlik et al. |
| 8,218,697 | B2 | 7/2012 | Guess et al. |
| 8,270,456 | B2 | 9/2012 | Leach et al. |
| 8,274,342 | B2 | 9/2012 | Tsutsumi et al. |
| 8,306,480 | B2 | 11/2012 | Muhammad et al. |
| 8,331,477 | B2 | 12/2012 | Huang et al. |
| 8,349,933 | B2 | 1/2013 | Bhandari et al. |
| 8,351,533 | B2 | 1/2013 | Shrivastava et al. |
| 8,385,855 | B2 | 2/2013 | Lorg et al. |
| 8,385,871 | B2 | 2/2013 | Wyville |
| 8,391,878 | B2 | 3/2013 | Tenny |
| 8,417,750 | B2 | 4/2013 | Yan et al. |
| 8,422,412 | B2 | 4/2013 | Hahn |
| 8,422,540 | B1 | 4/2013 | Negus et al. |
| 8,428,542 | B2 | 4/2013 | Bornazyan |
| 8,446,892 | B2 | 5/2013 | Ji et al. |
| 8,457,549 | B2 | 6/2013 | Weng et al. |
| 8,462,697 | B2 | 6/2013 | Park et al. |
| 8,467,757 | B2 | 6/2013 | Ahn |
| 8,498,585 | B2 | 7/2013 | Vandenameele |
| 8,502,924 | B2 | 8/2013 | Liou et al. |
| 8,509,129 | B2 | 8/2013 | Deb et al. |
| 8,521,090 | B2 | 8/2013 | Kim et al. |
| 8,576,752 | B2 | 11/2013 | Sarca |
| 8,611,401 | B2 | 12/2013 | Lakkis |
| 8,619,916 | B2 | 12/2013 | Jong |
| 8,625,686 | B2 | 1/2014 | Li et al. |
| 8,626,090 | B2 | 1/2014 | Dalipi |
| 8,649,417 | B2 | 2/2014 | Baldemair et al. |
| 8,711,943 | B2 | 4/2014 | Rossato et al. |
| 8,743,674 | B2 | 6/2014 | Parnaby et al. |
| 8,744,377 | B2 | 6/2014 | Rimini et al. |
| 8,750,786 | B2 | 6/2014 | Larsson et al. |
| 8,755,756 | B1 | 6/2014 | Zhang et al. |
| 8,767,869 | B2 | 7/2014 | Rimini et al. |
| 8,787,907 | B2 | 7/2014 | Jain et al. |
| 8,798,177 | B2 | 8/2014 | Park et al. |
| 8,804,975 | B2 | 8/2014 | Harris et al. |
| 8,837,332 | B2 | 9/2014 | Khojastepour et al. |
| 8,842,584 | B2 | 9/2014 | Jana et al. |
| 8,879,433 | B2 | 11/2014 | Khojastepour et al. |
| 8,879,811 | B2 | 11/2014 | Liu et al. |
| 8,913,528 | B2 | 12/2014 | Cheng et al. |
| 8,929,550 | B2 | 1/2015 | Shattil et al. |
| 8,937,874 | B2 | 1/2015 | Gainey et al. |
| 8,942,314 | B2 | 1/2015 | Aparin |
| 8,995,410 | B2 | 3/2015 | Balan et al. |
| 8,995,932 | B2 | 3/2015 | Wyville |
| 9,014,069 | B2 | 4/2015 | Patil et al. |
| 9,019,849 | B2 | 4/2015 | Hui et al. |
| 9,031,567 | B2 | 5/2015 | Haub |
| 9,042,838 | B2 | 5/2015 | Braithwaite |
| 9,054,795 | B2 | 6/2015 | Choi et al. |
| 9,065,519 | B2 | 6/2015 | Cyzs et al. |
| 9,077,421 | B1 | 7/2015 | Mehlman et al. |
| 9,112,476 | B2 | 8/2015 | Basaran et al. |
| 9,124,475 | B2 | 9/2015 | Li et al. |
| 9,130,747 | B2 | 9/2015 | Zinser et al. |
| 9,136,883 | B1 | 9/2015 | Moher et al. |
| 9,160,430 | B2 | 10/2015 | Maltsev et al. |
| 9,184,902 | B2 | 11/2015 | Khojastepour et al. |
| 9,185,711 | B2 | 11/2015 | Lin et al. |
| 9,231,647 | B2 | 1/2016 | Polydoros et al. |
| 9,231,712 | B2 | 1/2016 | Hahn et al. |
| 9,236,996 | B2 | 1/2016 | Khandani |
| 9,264,024 | B2 | 2/2016 | Shin et al. |
| 9,312,895 | B1 | 4/2016 | Gupta et al. |

(56) References Cited

U.S. PATENT DOCUMENTS

| | | |
|---|---|---|
| 9,325,432 B2 | 4/2016 | Hong et al. |
| 9,331,737 B2 | 5/2016 | Hong et al. |
| 9,413,500 B2 | 8/2016 | Chincholi et al. |
| 9,413,516 B2 | 8/2016 | Khandani |
| 9,455,756 B2 | 9/2016 | Choi et al. |
| 9,461,698 B2 | 10/2016 | Moffatt et al. |
| 9,479,198 B2 | 10/2016 | Moher et al. |
| 9,490,918 B2 | 11/2016 | Negus et al. |
| 9,490,963 B2 | 11/2016 | Choi et al. |
| 9,537,543 B2 | 1/2017 | Choi |
| 9,559,734 B2 | 1/2017 | Hwang et al. |
| 9,621,221 B2 | 4/2017 | Hua et al. |
| 9,742,593 B2 | 8/2017 | Moorti et al. |
| 2002/0034191 A1 | 3/2002 | Shattil |
| 2002/0064245 A1 | 5/2002 | McCorkle |
| 2002/0072344 A1 | 6/2002 | Souissi |
| 2002/0109631 A1 | 8/2002 | Li et al. |
| 2002/0154717 A1 | 10/2002 | Shima et al. |
| 2002/0172265 A1 | 11/2002 | Kenney |
| 2003/0031279 A1 | 2/2003 | Blount et al. |
| 2003/0099287 A1 | 5/2003 | Arambepola |
| 2003/0104787 A1 | 6/2003 | Blount et al. |
| 2003/0148748 A1 | 8/2003 | Shah |
| 2004/0106381 A1 | 6/2004 | Tiller |
| 2004/0266378 A1 | 12/2004 | Fukamachi et al. |
| 2005/0030888 A1 | 2/2005 | Thesling |
| 2005/0078743 A1 | 4/2005 | Shohara |
| 2005/0101267 A1 | 5/2005 | Smithson |
| 2005/0129152 A1 | 6/2005 | Hillstrom |
| 2005/0159128 A1 | 7/2005 | Collins et al. |
| 2005/0190870 A1 | 9/2005 | Blount et al. |
| 2005/0250466 A1 | 11/2005 | Varma et al. |
| 2005/0254555 A1 | 11/2005 | Teague |
| 2005/0282500 A1 | 12/2005 | Wang et al. |
| 2006/0029124 A1 | 2/2006 | Grant et al. |
| 2006/0030277 A1 | 2/2006 | Cyr et al. |
| 2006/0058022 A1 | 3/2006 | Webster et al. |
| 2006/0083297 A1 | 4/2006 | Yan et al. |
| 2006/0209754 A1 | 9/2006 | Ji et al. |
| 2006/0240769 A1 | 10/2006 | Proctor et al. |
| 2006/0273853 A1 | 12/2006 | Suzuki et al. |
| 2007/0018722 A1 | 1/2007 | Jaenecke |
| 2007/0105509 A1 | 5/2007 | Muhammad et al. |
| 2007/0207747 A1 | 9/2007 | Johnson et al. |
| 2007/0207748 A1 | 9/2007 | Toncich |
| 2007/0249314 A1 | 10/2007 | Sanders et al. |
| 2007/0274372 A1 | 11/2007 | Asai et al. |
| 2007/0283220 A1 | 12/2007 | Kim |
| 2007/0296625 A1 | 12/2007 | Bruzzone et al. |
| 2008/0037801 A1 | 2/2008 | Alves et al. |
| 2008/0089397 A1 | 4/2008 | Vetter et al. |
| 2008/0107046 A1 | 5/2008 | Kangasmaa et al. |
| 2008/0111754 A1 | 5/2008 | Osterhues et al. |
| 2008/0131133 A1 | 6/2008 | Blunt et al. |
| 2008/0144852 A1 | 6/2008 | Rebandt et al. |
| 2008/0192636 A1 | 8/2008 | Briscoe et al. |
| 2008/0219339 A1 | 9/2008 | Chrabieh et al. |
| 2008/0219377 A1 | 9/2008 | Nisbet |
| 2008/0279122 A1 | 11/2008 | Fukuda et al. |
| 2009/0022089 A1 | 1/2009 | Rudrapatna |
| 2009/0034437 A1 | 2/2009 | Shin et al. |
| 2009/0047914 A1 | 2/2009 | Axness et al. |
| 2009/0115912 A1 | 5/2009 | Liou et al. |
| 2009/0180404 A1 | 7/2009 | Jung et al. |
| 2009/0186582 A1 | 7/2009 | Muhammad et al. |
| 2009/0213770 A1 | 8/2009 | Mu |
| 2009/0221231 A1 | 9/2009 | Murch et al. |
| 2009/0262852 A1 | 10/2009 | Orlik et al. |
| 2009/0303908 A1 | 12/2009 | Deb et al. |
| 2010/0014600 A1 | 1/2010 | Li et al. |
| 2010/0014614 A1 | 1/2010 | Leach et al. |
| 2010/0022201 A1 | 1/2010 | Vandenameele |
| 2010/0031036 A1 | 2/2010 | Chauncey et al. |
| 2010/0056166 A1 | 3/2010 | Tenny |
| 2010/0103900 A1 | 4/2010 | Ahn et al. |
| 2010/0117693 A1 | 5/2010 | Buer et al. |
| 2010/0136900 A1 | 6/2010 | Seki |
| 2010/0150032 A1 | 6/2010 | Zinser et al. |
| 2010/0150033 A1 | 6/2010 | Zinser et al. |
| 2010/0150070 A1 | 6/2010 | Chae et al. |
| 2010/0159858 A1 | 6/2010 | Dent et al. |
| 2010/0197231 A1 | 8/2010 | Kenington |
| 2010/0208854 A1 | 8/2010 | Guess et al. |
| 2010/0215124 A1 | 8/2010 | Zeong et al. |
| 2010/0226356 A1 | 9/2010 | Sahin et al. |
| 2010/0226416 A1 | 9/2010 | Dent et al. |
| 2010/0226448 A1 | 9/2010 | Dent |
| 2010/0232324 A1 | 9/2010 | Radunovic et al. |
| 2010/0266057 A1 | 10/2010 | Shrivastava et al. |
| 2010/0277289 A1* | 11/2010 | Brauner ............ G06K 7/0008 340/10.51 |
| 2010/0278085 A1 | 11/2010 | Hahn |
| 2010/0279602 A1 | 11/2010 | Larsson et al. |
| 2010/0284447 A1 | 11/2010 | Gore et al. |
| 2010/0295716 A1 | 11/2010 | Yamaki et al. |
| 2011/0013684 A1 | 1/2011 | Semenov et al. |
| 2011/0013735 A1 | 1/2011 | Huang et al. |
| 2011/0026509 A1 | 2/2011 | Tanaka |
| 2011/0081880 A1 | 4/2011 | Ahn |
| 2011/0149714 A1 | 6/2011 | Rimini et al. |
| 2011/0171922 A1 | 7/2011 | Kim et al. |
| 2011/0216813 A1 | 9/2011 | Baldemair et al. |
| 2011/0222631 A1 | 9/2011 | Jong |
| 2011/0227664 A1 | 9/2011 | Wyville |
| 2011/0243202 A1 | 10/2011 | Lakkis |
| 2011/0250858 A1 | 10/2011 | Jain et al. |
| 2011/0254639 A1 | 10/2011 | Tsutsumi et al. |
| 2011/0256857 A1 | 10/2011 | Chen et al. |
| 2011/0268232 A1 | 11/2011 | Park et al. |
| 2011/0311067 A1 | 12/2011 | Harris et al. |
| 2011/0319044 A1 | 12/2011 | Bornazyan |
| 2012/0021153 A1 | 1/2012 | Bhandari et al. |
| 2012/0052892 A1 | 3/2012 | Braithwaite |
| 2012/0063369 A1 | 3/2012 | Lin et al. |
| 2012/0063373 A1 | 3/2012 | Chincholi et al. |
| 2012/0140685 A1 | 6/2012 | Lederer et al. |
| 2012/0140860 A1 | 6/2012 | Rimini et al. |
| 2012/0147790 A1 | 6/2012 | Khojastepour et al. |
| 2012/0154249 A1 | 6/2012 | Khojastepour et al. |
| 2012/0155335 A1 | 6/2012 | Khojastepour et al. |
| 2012/0155336 A1 | 6/2012 | Khojastepour et al. |
| 2012/0201153 A1 | 8/2012 | Bharadia et al. |
| 2012/0201173 A1 | 8/2012 | Jain et al. |
| 2012/0224497 A1 | 9/2012 | Lindoff et al. |
| 2013/0005284 A1 | 1/2013 | Dalipi |
| 2013/0044791 A1 | 2/2013 | Rimini et al. |
| 2013/0077502 A1 | 3/2013 | Gainey et al. |
| 2013/0089009 A1 | 4/2013 | Li et al. |
| 2013/0102254 A1 | 4/2013 | Cyzs et al. |
| 2013/0114468 A1 | 5/2013 | Hui et al. |
| 2013/0120190 A1* | 5/2013 | McCune, Jr. ........ H01Q 3/2605 342/368 |
| 2013/0142030 A1 | 6/2013 | Parnaby et al. |
| 2013/0155913 A1 | 6/2013 | Sarca |
| 2013/0166259 A1 | 6/2013 | Weber et al. |
| 2013/0194984 A1 | 8/2013 | Cheng et al. |
| 2013/0215805 A1 | 8/2013 | Hong et al. |
| 2013/0225101 A1 | 8/2013 | Basaran et al. |
| 2013/0253917 A1 | 9/2013 | Schildbach |
| 2013/0259343 A1 | 10/2013 | Liu et al. |
| 2013/0286903 A1 | 10/2013 | Khojastepour et al. |
| 2013/0294523 A1 | 11/2013 | Rossato et al. |
| 2013/0301487 A1 | 11/2013 | Khandani |
| 2013/0301488 A1 | 11/2013 | Hong et al. |
| 2013/0308717 A1 | 11/2013 | Maltsev et al. |
| 2013/0315211 A1 | 11/2013 | Balan et al. |
| 2014/0011461 A1 | 1/2014 | Bakalski et al. |
| 2014/0016515 A1 | 1/2014 | Jana et al. |
| 2014/0036736 A1 | 2/2014 | Wyville |
| 2014/0072072 A1 | 3/2014 | Ismail et al. |
| 2014/0126437 A1 | 5/2014 | Patil et al. |
| 2014/0169236 A1 | 6/2014 | Choi et al. |
| 2014/0185533 A1 | 7/2014 | Haub |
| 2014/0194073 A1 | 7/2014 | Wyville et al. |

(56) References Cited

U.S. PATENT DOCUMENTS

| | | |
|---|---|---|
| 2014/0206300 A1 | 7/2014 | Hahn et al. |
| 2014/0219139 A1 | 8/2014 | Choi et al. |
| 2014/0219449 A1 | 8/2014 | Shattil et al. |
| 2014/0269991 A1 | 9/2014 | Aparin |
| 2014/0313946 A1 | 10/2014 | Azadet |
| 2014/0348018 A1 | 11/2014 | Bharadia et al. |
| 2014/0348032 A1 | 11/2014 | Hua et al. |
| 2014/0349595 A1* | 11/2014 | Cox ............... H04B 1/0458 455/78 |
| 2014/0376416 A1* | 12/2014 | Choi ............... H04B 3/23 370/277 |
| 2015/0043685 A1* | 2/2015 | Choi ............... H04L 5/143 375/346 |
| 2015/0049834 A1 | 2/2015 | Choi et al. |
| 2015/0094008 A1 | 4/2015 | Maxim et al. |
| 2015/0103745 A1 | 4/2015 | Negus et al. |
| 2015/0139122 A1 | 5/2015 | Rimini et al. |
| 2015/0146765 A1 | 5/2015 | Moffatt et al. |
| 2015/0156003 A1 | 6/2015 | Khandani |
| 2015/0156004 A1 | 6/2015 | Khandani |
| 2015/0171903 A1 | 6/2015 | Mehlman et al. |
| 2015/0180522 A1 | 6/2015 | Wyville |
| 2015/0188646 A1 | 7/2015 | Bharadia et al. |
| 2015/0215937 A1 | 7/2015 | Khandani |
| 2015/0249444 A1 | 9/2015 | Shin et al. |
| 2015/0270865 A1 | 9/2015 | Polydoros et al. |
| 2015/0303984 A1 | 10/2015 | Braithwaite |
| 2016/0043759 A1 | 2/2016 | Choi et al. |
| 2016/0056846 A1 | 2/2016 | Moher et al. |
| 2016/0105213 A1 | 4/2016 | Hua et al. |
| 2016/0119019 A1 | 4/2016 | Pratt |
| 2016/0119020 A1 | 4/2016 | Charlon |
| 2016/0182097 A1 | 6/2016 | Jiang et al. |
| 2016/0218769 A1 | 7/2016 | Chang et al. |
| 2016/0266245 A1 | 9/2016 | Bharadia et al. |
| 2016/0269061 A1 | 9/2016 | Hwang et al. |
| 2016/0285486 A1 | 9/2016 | Qin et al. |
| 2016/0294425 A1 | 10/2016 | Hwang et al. |
| 2016/0344432 A1 | 11/2016 | Hwang et al. |
| 2016/0380706 A1 | 12/2016 | Tanzi et al. |
| 2017/0041095 A1 | 2/2017 | Hwang et al. |
| 2017/0187513 A9 | 6/2017 | Bharadia et al. |

FOREIGN PATENT DOCUMENTS

| | | |
|---|---|---|
| EP | 2237434 A1 | 10/2010 |
| EP | 2267946 A2 | 12/2010 |
| RU | 2256985 C2 | 7/2005 |
| WO | 2013173250 A1 | 11/2013 |
| WO | 2013185106 A1 | 12/2013 |
| WO | 2014093916 A1 | 6/2014 |

OTHER PUBLICATIONS

International Search Report and Written Opinion for International Application No. PCT/US18/24577.

McMichael et al., "Optimal Tuning of Analog Self-Interference Cancellers for Full-Duple Wireless Communication", Oct. 1-5, 2012, Fiftieth Annual Allerton Conference, Illinois, USA, pp. 246-251.

* cited by examiner

US 10,382,085 B2

ANALOG SELF-INTERFERENCE CANCELLATION SYSTEMS FOR CMTS

CROSS-REFERENCE TO RELATED APPLICATIONS

This application is a continuation of U.S. patent application Ser. No. 16/052,458, filed 1 Aug. 2018, which claims the benefit of U.S. Provisional Application Ser. No. 62/539,716, filed on 1 Aug. 2017, and of U.S. Provisional Application Ser. No. 62/634,340, filed on 23 Feb. 2018, which are both incorporated in their entirety by this reference.

TECHNICAL FIELD

This invention relates generally to the electronic communications field, and more specifically to new and useful analog self-interference cancellation systems for CMTS.

BACKGROUND

Traditional cable modems operate using frequency-division duplexed communications; that is, communication from the cable modems to their corresponding cable modem termination system (CMTS) (i.e., uplink communication) occurs in a different frequency band than communications from the CMTS to the cable modem (i.e., downlink communication). Recent work in the electronic communications field has led to advancements in developing full-duplex communications systems; these systems, if implemented successfully, could allow for more efficient allocation of communication in a given bandwidth spectrum. One major roadblock to successful implementation of full-duplex communications is the problem of self-interference. While progress has been made in this area, many solutions intended to address self-interference are less than ideal for the particular needs of cable modem communication. Thus, there is a need in the electronic communications field to create new and useful analog self-interference cancellation systems for CMTS. This invention provides such new and useful systems.

DESCRIPTION OF THE INVENTION EMBODIMENTS

The following description of the invention embodiments of the invention is not intended to limit the invention to these invention embodiments, but rather to enable any person skilled in the art to make and use this invention.

1. Self-Interference Cancellation for CMTS

Figure 1A:
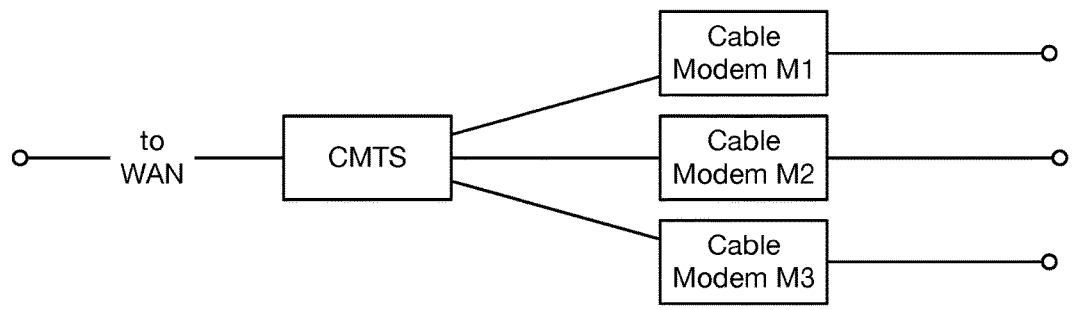
FIG. 1A is a diagram view of a CMTS distribution system.
Figure 1B:
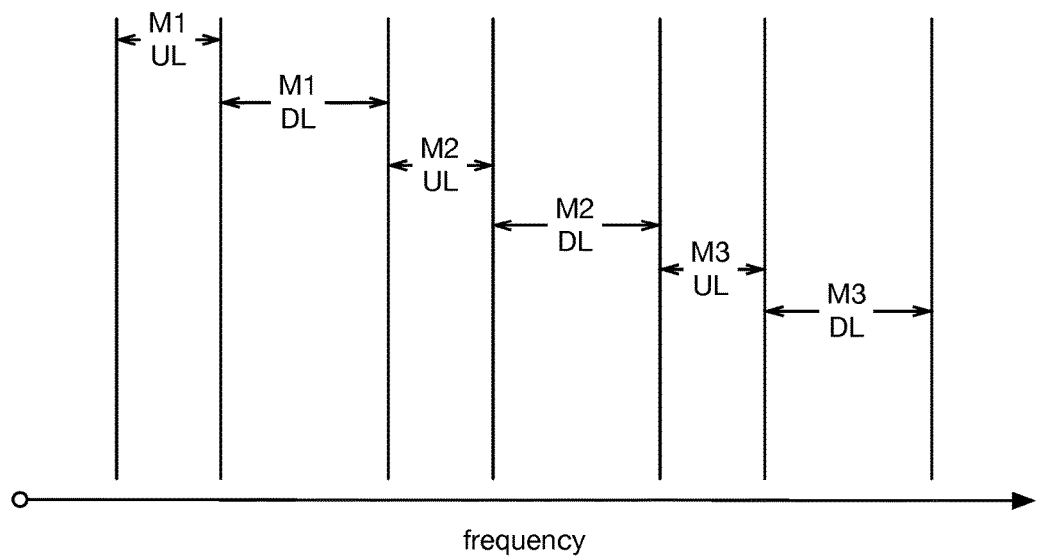
FIG. 1B is a spectral diagram view of a frequency division of a CMTS distribution system.

As shown in FIG. 1A, traditional cable modem termination systems (CMTSs) communicate with several cable modems connected to the same coaxial cable system, splitting bandwidth between the modems; this bandwidth split is as shown in FIG. 1B. M1 UL refers to upload bandwidth for the first cable modem (M1) (i.e., transmissions from M1 to CMTS), M1 DL refers to download bandwidth for the first cable modem (M1) (i.e., transmissions from CMTS to M1), etc.

Figure 2A:
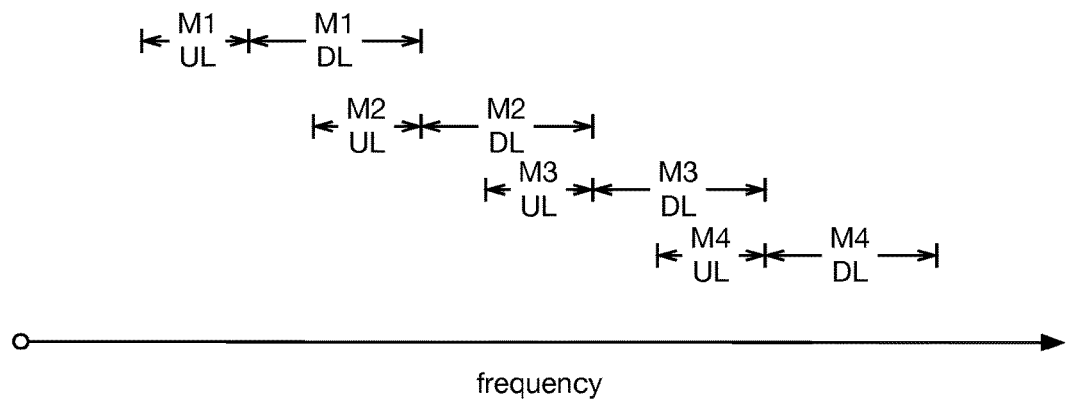
FIG. 2A is a spectral diagram view of a frequency division of a CMTS distribution system.
Figure 2B:
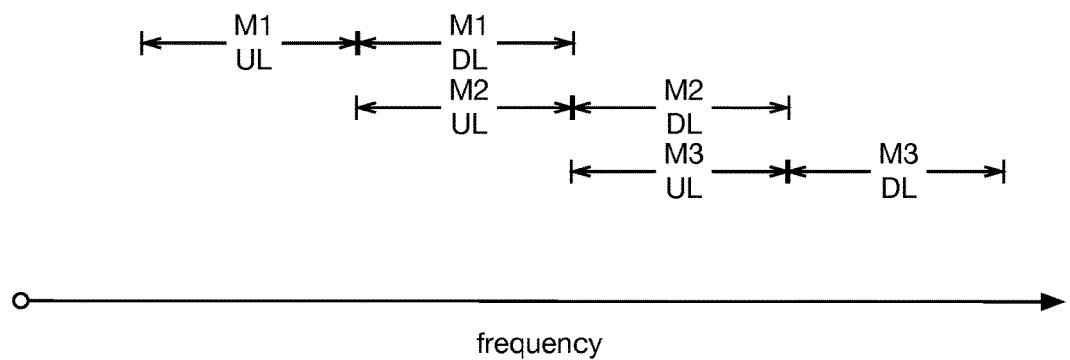
FIG. 2B is a spectral diagram view of a frequency division of a CMTS distribution system.

The systems of the present application are directed to enabling full-duplex communications between CMTSs and cable modems. Such full-duplex communications could result in greater available bandwidth for communications. For example, full-duplex communications could be implemented at the CMTS but not at cable modems, allowing for the re-allocation of bandwidth across modems. For example, if bandwidth allocation is kept the same per-mode, an additional modem could communicate in the same spectrum, as shown in FIG. 2A. Alternatively, bandwidth may be increased per-modem, as shown in FIG. 2B. In this scenario, while the CMTS can receive and transmit at the same frequencies (e.g., M2 DL and M1 UL), the modem cannot (so M1 DL and UL must be frequency separated, for instance).

Figure 3A:
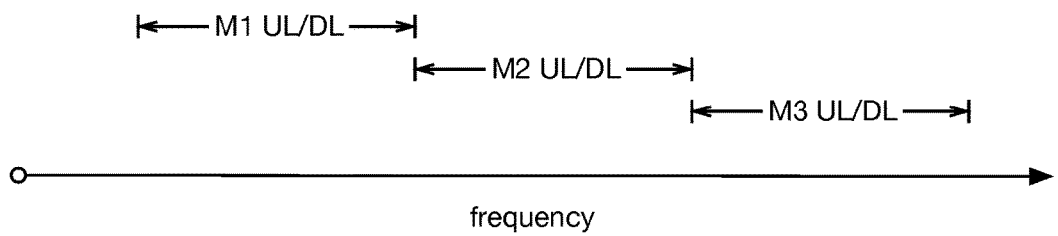
FIG. 3A is a spectral diagram view of a frequency division of a CMTS distribution system.
Figure 3B:
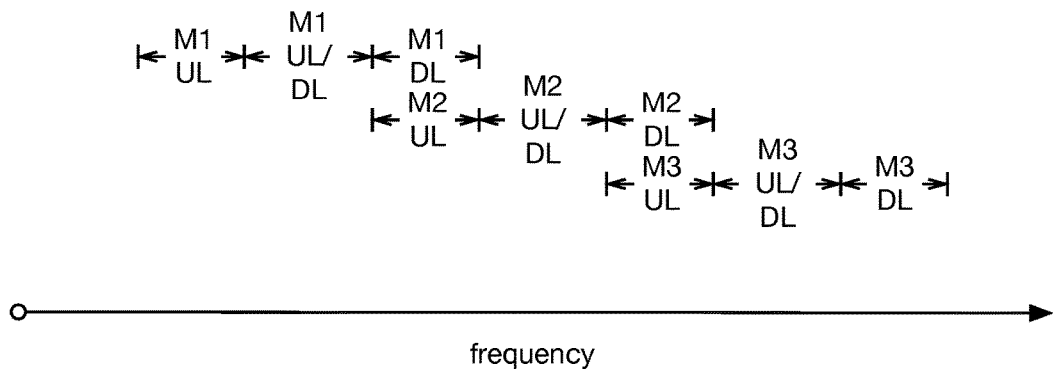
FIG. 3B is a spectral diagram view of a frequency division of a CMTS distribution system.

Full-duplex communications may alternatively be implemented at both CMTS and Cable modems. Such an implementation may be purely full duplex, as shown in FIG. 3A, or take a hybrid approach, as shown in FIG. 3B. In this scenario, while both of the CMTS and modems can receive and transmit at the same frequencies (e.g., M2 DL and M1 UL).

Full-duplex communications may additionally or alternatively be implemented in any manner (e.g., at modems and not at a CMTS).

While full-duplex communications systems have substantial value to the communications field, such systems have been known to face challenges due to self-interference; because reception and transmission occur at the same time on the same channel, the received signal at a full-duplex transceiver can include undesired signal components from the signal being transmitted from that transceiver (e.g., resulting from reflections at cable couplings or due to transmission line defects). As a result, full-duplex communications systems often include analog and/or digital self-interference cancellation circuits to reduce self-interference.

Full-duplex transceivers preferably sample transmission output as baseband digital signals, intermediate frequency (IF) analog signals, or as radio-frequency (RF) analog signals, but full-duplex transceivers can additionally or alternatively sample transmission output in any suitable manner (e.g., as IF digital signals). This sampled transmission output can be used by full-duplex transceivers to remove interference from received communications data (e.g., as RF/IF analog signals or baseband digital signals). In many full-duplex transceivers, an analog self-interference cancellation system is paired with a digital self-interference cancellation system. The analog self-interference cancellation system removes a first portion of self-interference by summing delayed, phase shifted and scaled versions of the RF transmit signal to create an RF self-interference cancellation signal, which is then subtracted from the RF receive signal. Alternatively, the analog cancellation system can perform similar tasks at an intermediate frequency. After the RF (and/or IF) receive signal has the RF/IF self-interference cancellation signal subtracted, it passes through an analog-to-digital converter of the receiver (and becomes a digital receive signal). After this stage, a digital self-interference cancellation signal (created by transforming a digital transmit signal) is then subtracted from the digital receive signal.

The systems of the present disclosure are preferably designed to enable full-duplex communications for cable modem/CMTS communications. Compared to typical wireless applications, the frequency range of operation generally extends substantially lower in the radio frequency spectrum (e.g., 5 MHz to 1000 MHz). Further, because wired communications is less lossy (and self-interference occurs largely from echoes), longer time-delayed reflections may contribute to self-interference in cable communications than in wireless communications. The systems of the present disclosure are preferably specially adapted to these conditions, but may additionally or alternatively be used and/or adapted for any other applicable systems, including active sensing systems (e.g., RADAR), wired communications systems, wireless communications systems, channel emulators, reflectometers, PIM analyzers and/or any other suitable measurement equipment system, including communication systems where transmit and receive bands are close in frequency, but not overlapping, or even TDD (time division duplex) systems.

2. Self-Interference Cancellation System for CMTS

Figure 4:
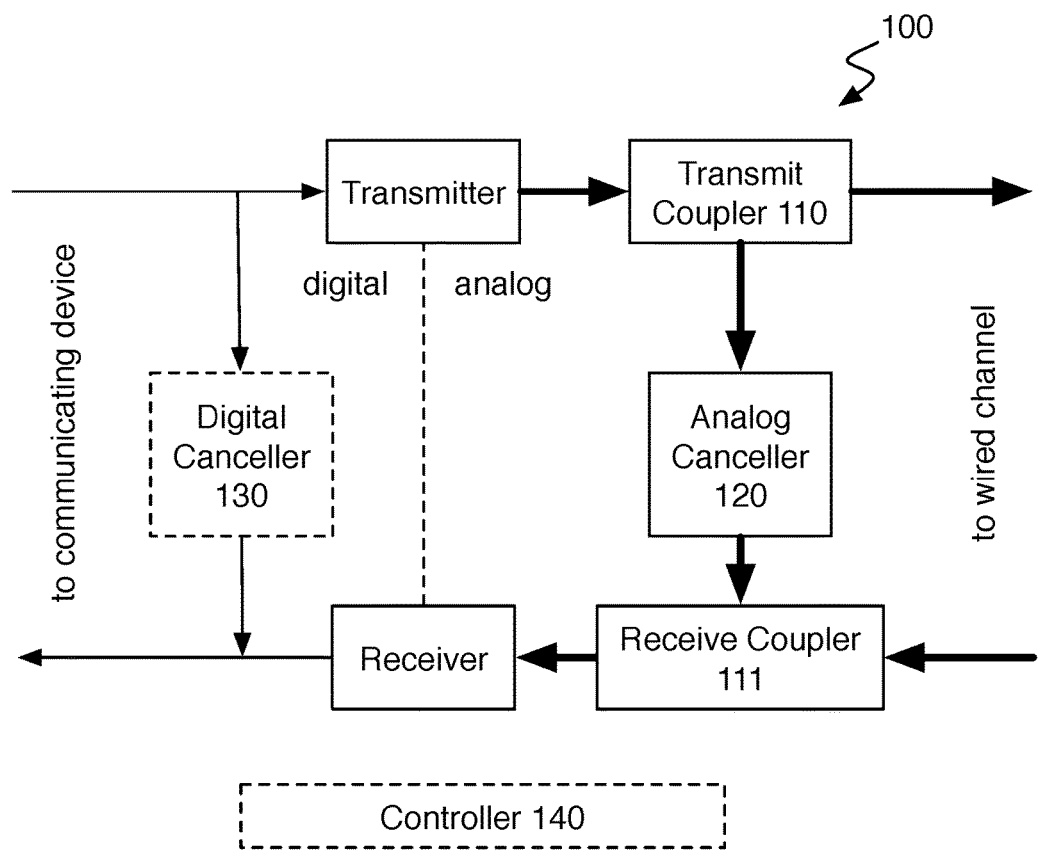
FIG. 4 is a schematic view of a system of an invention embodiment.

As shown in FIG. 4, a system 100 for self-interference cancellation for CMTS includes a transmit coupler 110, an analog self-interference canceller 120, and a receive coupler 111. The system 100 may additionally or alternatively include a digital self-interference canceller 130 and/or a controller 140.

The system 100 functions to increase the performance of full-duplex transceivers (or other applicable systems) by performing self-interference cancellation.

The system 100 may perform self-interference cancellation by performing analog and/or digital self-interference cancellation based on any number of sampled analog and/or digital transmit signals. For example, the digital self-interference canceller 130 may sample a digital transmit signal, as shown in FIG. 4, but the digital self-interference canceller 130 may additionally or alternatively sample an analog transmit signal (e.g., through an ADC coupled to the analog transmit signal).

The system 100 preferably performs analog and digital self-interference cancellation simultaneously and in parallel, but may additionally or alternatively perform analog and/or digital self-interference cancellation at any suitable times and in any order.

The system 100 is preferably implemented using both digital and analog circuitry. Digital circuitry is preferably implemented using a general-purpose processor, a digital signal processor, an application specific integrated circuit (ASIC), a field programmable gate array (FPGA) and/or any suitable processor(s) or circuit(s). Analog circuitry is preferably implemented using analog integrated circuits (ICs) but may additionally or alternatively be implemented using discrete components (e.g., capacitors, resistors, transistors), wires, transmission lines, transformers, couplers, hybrids, waveguides, digital components, mixed-signal components, or any other suitable components. Both digital and analog circuitry may additionally or alternatively be implemented using optical circuitry (e.g., photonic integrated circuits). The system 100 preferably includes memory to store configuration data, but may additionally or alternatively be configured using externally stored configuration data or in any suitable manner.

The system 100 preferably is coupled to a receiver. The receiver functions to receive analog receive signals transmitted over a communications link (e.g., a coaxial cable, a wireless channel). The receiver preferably converts analog receive signals into digital receive signals for processing by a communications system, but may additionally or alternatively not convert analog receive signals (passing them through directly without conversion).

The receiver is preferably a radio-frequency (RF) receiver, but may additionally or alternatively be any suitable receiver. The receiver is preferably coupled to the communications link by a duplexer-coupled coaxial cable, but may additionally or alternatively be coupled to the communications link in any suitable manner.

The receiver preferably includes an analog-to-digital converter (ADC) and a frequency downconverter. The receiver may additionally include a low-noise amplifier. The receiver may additionally or alternatively include amplifiers, filters, signal processors and/or any other suitable components. In one variation of a preferred embodiment, the receiver includes only analog processing circuitry (e.g., amplifiers, filters, attenuators, delays). The receiver may function to scale, shift, and/or otherwise modify the receive signal. The downconverter functions to downconvert the analog receive signal from RF (or any other suitable frequency) to a baseband or IF analog receive signal, and the analog-to-digital converter (ADC) functions to convert the baseband or IF analog receive signal to a digital receive signal.

Likewise, the system 100 is preferably also coupled to a transmitter. The transmitter functions to transmit signals of the communications system over a communications link to a second communications system. The transmitter preferably converts digital transmit signals into analog transmit signals.

The transmitter is preferably a radio-frequency (RF) transmitter, but may additionally or alternatively be any suitable transmitter.

The transmitter is preferably coupled to the communications link by a directionally-coupled coaxial cable, but may additionally or alternatively be coupled to the communications link in any suitable manner.

The transmitter preferably includes a digital-to-analog converter (DAC) and a frequency upconverter. The transmitter may additionally include a power amplifier. The transmitter may additionally or alternatively include amplifiers, filters, signal processors and/or any other suitable components. The transmitter may function to scale, phase shift, delay, and/or otherwise modify the transmit signal. The digital-to-analog converter (DAC) functions to convert the digital transmit signal to a baseband or IF analog transmit signal, and the upconverter functions to upconvert the baseband or IF analog transmit signal from baseband or IF to RF (or any other intended transmission frequency).

The transmit coupler 110 functions to provide a sample of the analog transmit signal for the analog canceller 120 and/or the digital canceller 130. Transmit couplers may additionally be used to split power between signal paths (e.g., splitting power between different analog canceller 120 blocks).

The transmit coupler 110 is preferably a short section directional transmission line coupler, but may additionally or alternatively be any power divider, power combiner, directional coupler, or other type of signal splitter. The transmit coupler 110 is preferably a passive coupler, but may additionally or alternatively be an active coupler (for instance, including power amplifiers). For example, the transmit coupler 110 may comprise a coupled transmission line coupler, a branch-line coupler, a Lange coupler, a Wilkinson power divider, a hybrid coupler, a hybrid ring coupler, a multiple output divider, a waveguide directional coupler, a waveguide power coupler, a hybrid transformer coupler, a cross-connected transformer coupler, a resistive or capacitive tee, and/or a resistive bridge hybrid coupler. The output ports of the transmit coupler 110 are preferably phase-shifted by ninety degrees, but may additionally or alternatively be in phase or phase shifted by any amount (e.g., zero degrees, 180 degrees).

Transmit couplers 110 may be arranged in series and/or in parallel. The configuration of multiple transmit couplers 110 in the system 100 is discussed in further detail in Section 3 (Self-Interference Cancellation System Configurations).

The receive coupler 111 functions to combine one or more analog self-interference cancellation signals (from analog/digital cancellers) with the analog receive signal.

The receive coupler 111 is preferably a short section directional transmission line coupler, but can additionally or alternatively be any power divider, power combiner, directional coupler, or other type of signal splitter. The receive coupler 111 is preferably a passive coupler, but can additionally or alternatively be an active coupler (for instance, including power amplifiers). For example, the receive coupler 111 can comprise a coupled transmission line coupler, a branch-line coupler, a Lange coupler, a Wilkinson power divider, a hybrid coupler, a hybrid ring coupler, a multiple output divider, a waveguide directional coupler, a waveguide power coupler, a hybrid transformer coupler, a cross-connected transformer coupler, a resistive tee, and/or a resistive bridge hybrid coupler. The output ports of the receive coupler 111 are preferably phase-shifted by ninety degrees, but can additionally or alternatively be in phase or phase shifted by any amount (e.g., zero degrees, 180 degrees).

The analog self-interference canceller 120 functions to produce an analog self-interference cancellation signal from the analog transmit signal that can be combined with the analog receive signal to reduce self-interference present in the analog receive signal. Prior to self-interference cancellation, the receive signal may contain both or either of an intended receive signal and self-interference. After self-interference cancellation, the receive signal (which may now be referred to as a "composite" receive signal, as it is the result of the combination of the receive signal and the self-interference cancellation signal) preferably still contains the intended receive signal (if one exists), and any remaining self-interference may be referred to as residual self-interference. The analog self-interference canceller 120 is preferably designed to operate at a single intermediate frequency (IF) band, but may additionally or alternatively be designed to operate at multiple IF bands, at one or multiple radio frequency (RF) bands, or at any suitable frequency band.

The analog self-interference canceller 120 is preferably implemented as one or more analog circuits that transform an RF transmit signal into an analog self-interference cancellation signal by combining a set of filtered, scaled, phase-shifted, and/or delayed versions of the RF transmit signal, but may additionally or alternatively be implemented as any suitable circuit. For instance, the analog self-interference canceller 120 may perform a transformation involving only a single version or copy of the RF transmit signal. The transformed signal (the analog self-interference cancellation signal) preferably represents at least a part of the self-interference component received at the receiver.

The analog self-interference canceller 120 is preferably adaptable to changing self-interference parameters in addition to changes in the analog transmit signal; for example, RF transceiver temperature, ambient temperature, wiring configuration, humidity, and RF transmitter power. Adaptation of the analog self-interference canceller 120 is preferably performed by a tuning circuit, but may additionally or alternatively be performed by a control circuit or other control mechanism included in the canceller 120, the controller 140, or any other suitable controller.

Figure 5:
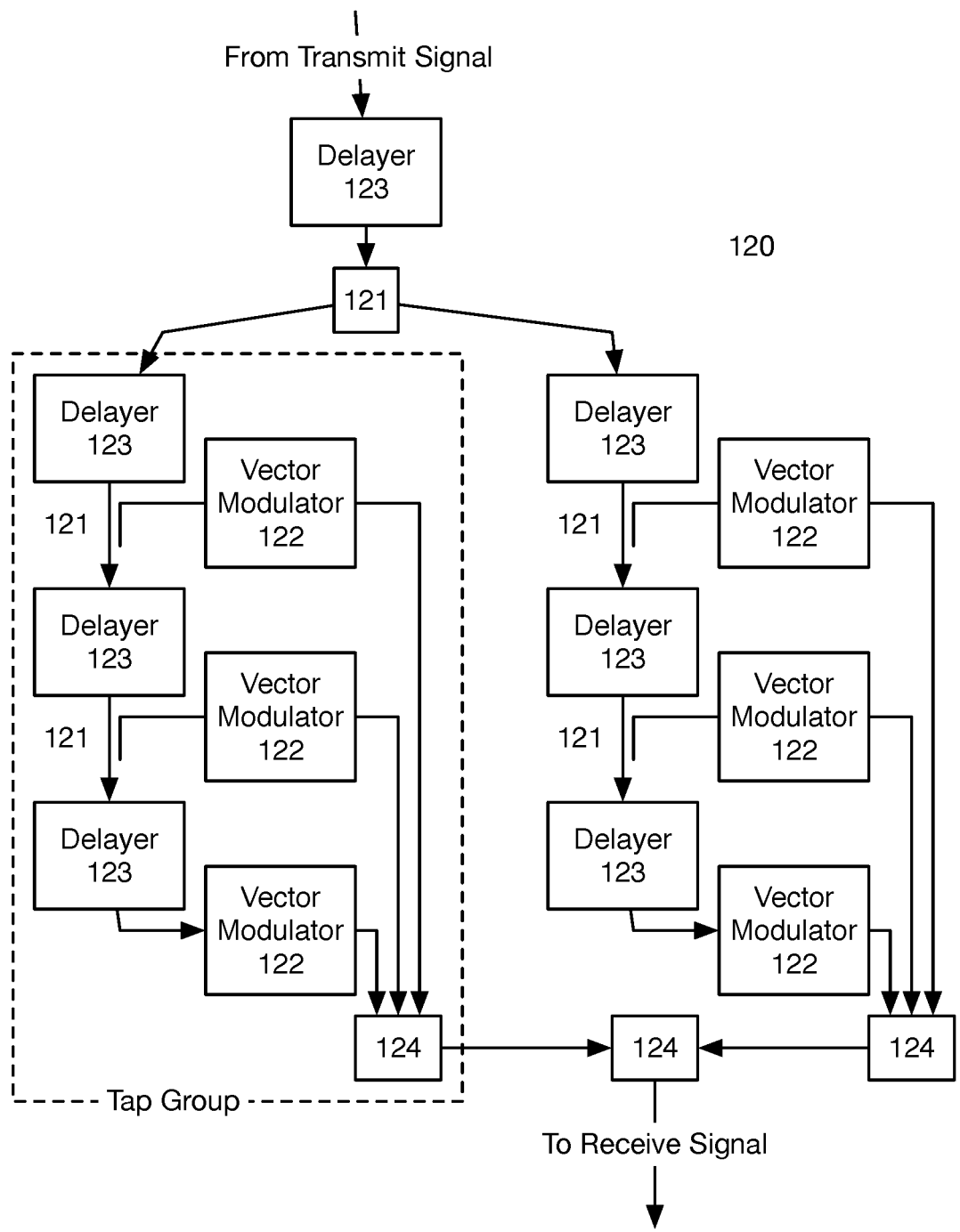
FIG. 5 is a schematic view of an analog self-interference canceller of a system of an invention embodiment.

In one implementation of an invention embodiment, the analog self-interference canceller includes sampling couplers 121, analog vector modulators 122, delayers 123, and combining couplers 124, as shown in FIG. 5. The analog self-interference canceller may additionally or alternatively include frequency downconverters 125, frequency upconverters 126, and/or amplifiers 127. In this implementation, the analog self-interference canceller 120 splits the transmit signal into signal paths using the sampling couplers 121 and transforms each of these signal paths (also referred to as 'taps') individually before recombining them at combining couplers 124. Note that taps may be organized into tap groups, as shown in FIG. 5, or in any other manner.

Note that in some cases, the signal paths can be filtered such that signal paths can operate on different frequency sub-bands. The frequency sub-bands can overlap in frequency; there can additionally or alternatively be multiple filters corresponding to the same frequency sub-band. In such implementations the canceller 120 may include filters.

The analog self-interference canceller 120 preferably transforms each tap by phase-shifting and/or scaling the signal components of each tap with a vector modulator 122 in addition to delaying signal components with delayers 123. The components of the analog self-interference canceller 120 be coupled in any manner that enables analog self-interference cancellation for the system 100. The analog self-interference canceller 120 may include any components coupled in any manner.

Figure 6:
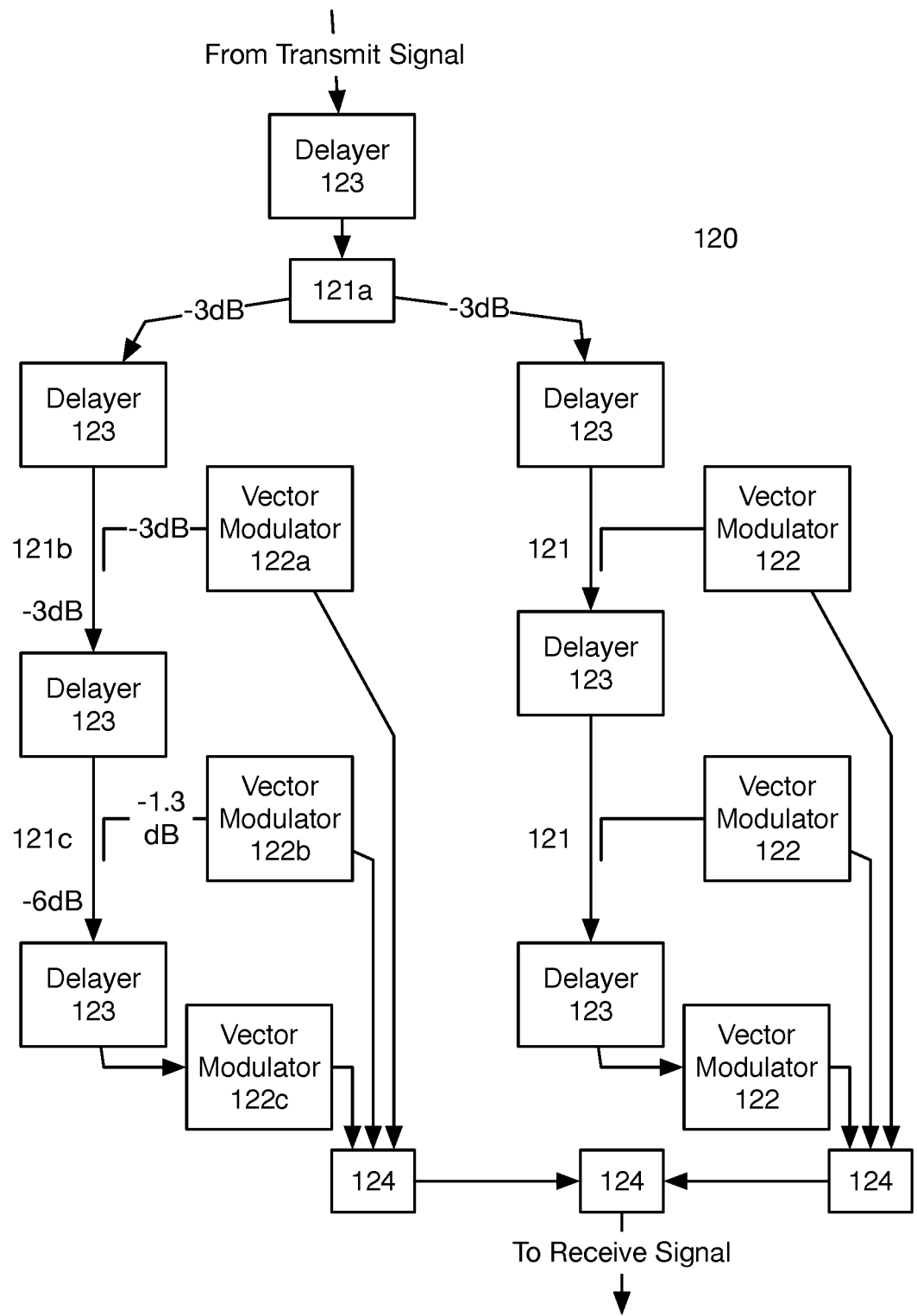
FIG. 6 is a schematic view of an analog self-interference canceller of a system of an invention embodiment.

Sampling couplers 121 function to split the transmit signal (or other signal components) into multiple transmit signal paths. Sampling couplers 121 preferably split an input signal into multiple signals having substantially the same waveform as the input signal; power may be split among output signals in any manner. For example, as shown in FIG. 6, sampling coupler 121a and 121b have two 3 dB ports, while sampling coupler 121c has one −1.25 dB port and one −6 dB port. In this example, the signal component at vector modulator 122*a* has a signal level of −6 dB relative to the transmit signal, the signal component at 122*b* has −7.25 dB, and the signal component at 122*c* has −12 dB.

The sampling coupler 121 is preferably a transmission line power divider, but may additionally or alternatively be any suitable power divider, splitter, or coupler. The sampling coupler 121 may additionally contain any suitable electronics for pre-processing the transmit signal; for example, the sampling coupler 121 may contain an amplifier to increase the power contained in one or more of the output transmit signals.

Each analog canceller 120 block preferably includes a sampling coupler 121; additionally or alternatively, analog canceller 120 blocks may share one or more sampling couplers 121.

The vector modulator 122 functions to phase shift and/or scale signal components of the analog self-interference canceller 120. The vector modulator 122 may perform one or more of phase shifting, phase inversion, amplification, and attenuation. Phase shifting can allow the canceller 120 to reflect the contribution of multiple signal components with offset phase, while signal scaling (e.g., attenuation, amplification, inversion) enables the canceller to appropriately match self-interference cancellation signal components to predicted or observed self-interference present in receive signals.

When scaling, the vector modulator 122 effectively multiplies the transmit signal components by a scale factor. For example, an attenuation of 34% might be represented as a scale factor of 0.66; a gain of 20% might be represented as a scale factor of 1.20; and an attenuation of 10% and a phase inversion might be represented as a scale factor of −0.90. Scale factors may be complex; for example, a scale factor of $e^{\wedge}(i*Pi/2)$ might be represented as a phase shift of ninety degrees.

Each vector modulator 122 preferably includes an impedance matching network at its input and output that compensates for variations in the vector modulator 122 input and output impedance (and/or phase shift amount) due to changes in signal component frequency or simply transforms the impedance to and from a suitable impedance level for the core of the phase shifter to a standardized impedance level (50 ohms). Alternatively, the vector modulator 122 may not include impedance matching networks. The impedance matching networks are preferably tunable (e.g., continuously or discretely variable) but may additionally or alternatively be static (i.e., the impedance transformation achieved by using the network is not variable).

The vector modulator 122 may generate output signal components using any suitable combination of circuit components. These components may be discrete (e.g., capacitors, inductors) or integrated (e.g., a single element with a fixed capacitance, inductance, and resistance), or any other suitable circuit components.

For example, a phase shifting stage of a vector modulator 122 may comprise an LC network (e.g., an LC tank circuit), including an inductive element and a capacitive element, which is coupled to additional phase shifting stages by a coupling capacitive element. Alternatively, such LC network stages may be magnetically coupled together by an inductive element (e.g., the inductive element of the LC tank, a separate coupling inductor, etc.). Alternatively or additionally, phase shifting stages may include tunable phase-shift elements (e.g., tunable capacitors, tunable inductors, etc.). For example, a phase shifting stage may include a varactor; by changing a control voltage of the varactor, the varactor's capacitance (and thus the amount of phase shift experienced by a signal passing through the stage) may be varied. In a related example, each phase shifting stage can be coupled to another phase shifting stage by a shunt varactor (e.g., the phase shifting stages are arranged in series, and each series pair of phase shifting stages are coupled by shunt varactors).

Scaling stages of the vector modulator 122 may include attenuators, amplifiers, phase inverters, and/or any other suitable components for scaling transmit signal components. Attenuators may be resistive attenuators (T pad, Pi pad, Bridged-T), capacitive dividers, amplifiers with less than unity gain, or any other suitable type of attenuator. Amplifiers may be transistor amplifiers, vacuum tube amplifiers, op-amps, or any other suitable type of amplifier. Phase inverters may be any phase inversion devices, including NPN/PNP phase inversion circuits, transformers and/or inverting amplifiers.

The vector modulators 122 preferably are capable of phase shift, attenuation, gain, and phase inversion, but may alternatively be capable only of a subset of said capabilities. Each vector modulator 122 preferably includes all four capabilities in a single device but may additionally or alternatively separate capabilities into different sections (e.g., an amplifier with tunable gain but no inversion capability, along with a separate phase shifting circuit). The vector modulator 122 is preferably controlled by a tuning circuit or the controller 140, but may additionally or alternatively be controlled in any suitable manner.

The delayers 123 function to delay transmit signal components, preferably to match corresponding delays in received self-interference. The delay introduced by each delayer 123 (also referred to as a delayer delay) is preferably fixed (i.e., the delayer 123 is a fixed delayer), but delayers 123 can additionally or alternatively introduce variable delays. The delayer 123 is preferably implemented as an analog delay circuit (e.g., a bucket-brigade device, a long transmission line, RC/LC/RLC networks, surface acoustic wave (SAW) delay lines, a filter or an optical delay line) but can additionally or alternatively be implemented in any other suitable manner. If the delayer 123 is a variable delayer, the delay introduced is preferably set by a tuning circuit, but can additionally or alternatively be set in any suitable manner.

The delayers 123 may cover the full band or only partial (sub-) bands; e.g. if it reduces cost or improves performance the total bandwidth of the delay may be split up and suitable sub-band SAW devices may be used.

Additionally, in order to reduce the number of different delay devices in the bill of material (BOM) or to reduce cost or increase performance, these different sub-bands may be converted into one preferred sub-band via frequency conversion (mixing) and afterwards separated again.

Each delayer 123 preferably includes an impedance matching network at its input and output that compensates for variations in the delayer 123 input and output impedance (and/or delay amount) due to changes in signal component frequency or transforms the impedance to and from a suitable impedance level for the core of the delayer to a standardized impedance level (50 ohms). Alternatively, the delayer 123 cannot include impedance matching networks. The impedance matching networks are preferably tunable (e.g., continuously or discretely variable) but can additionally or alternatively be static (i.e., the impedance transformation achieved by using the network is not variable).

Note that changes in phase shift can affect delays (and vice versa), so the vector modulator 122 and delayer 123 are preferably tuned cooperatively (e.g., if a phase shifting value is changed, a delayer value can also be changed to compensate for unintended delays introduced by the phase shift).

After transformation by a vector modulator 122 and/or a delayer 123, transmit signal components are transformed into self-interference cancellation signal components, which can be combined to form a self-interference cancellation signal.

Combining couplers 124 function to combine the self-interference cancellation signal components to generate an analog self-interference cancellation signal; the analog self-interference cancellation signal can then be combined with an analog receive signal to remove self-interference. The combining coupler 124 preferably combines self-interference cancellation signal components (resulting from multiple signal paths) and outputs the resulting analog self-interference cancellation signal. The combining coupler 124 is preferably a transmission line coupler, but can additionally or alternatively be any suitable type of coupler (described in the sampling coupler 121 sections). The combining coupler 124 can additionally contain any suitable electronics for post-processing the self-interference cancellation signal before outputting it; for example, the combining coupler 124 can contain an amplifier to increase the power of the self-interference cancellation signal. The combining coupler 124 may combine signal components to form signals (e.g., self-interference cancellation signal components can be combined to form a self-interference cancellation signal) but may additionally or alternatively combine signal components to form signal super-components, which can later be combined to form signals. Note that there is not any inherent physical difference between signal components, signal super-components, and signals; different terms are used to identify how a signal or signal component is ultimately used. For example, a set of first and second signal components may be combined to form a first super-component, a set of third and fourth signal components may be combined to form a second super-component, and the first and second super-components may be combined to form a signal (or a super-super-component if later combination was to occur, etc.).

The canceller 120 may also contain one or more linearization circuits to compensate for non-linearity generated in the self-interference canceller 120; as for example in amplifiers, switches, mixers, scalers, phase shifters and delayers.

Figure 7:
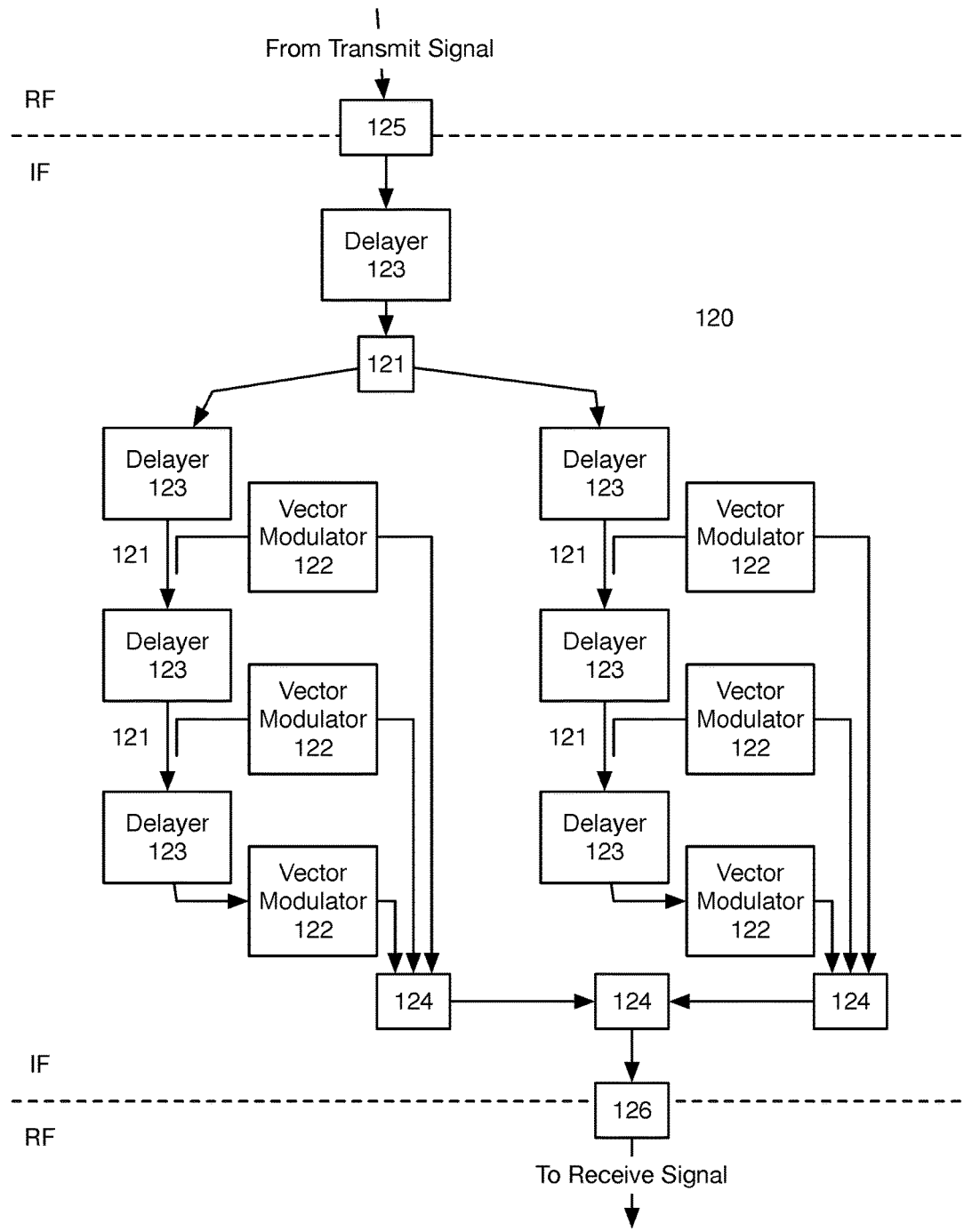
FIG. 7 is a schematic view of an analog self-interference canceller of a system of an invention embodiment.
Figure 8A:
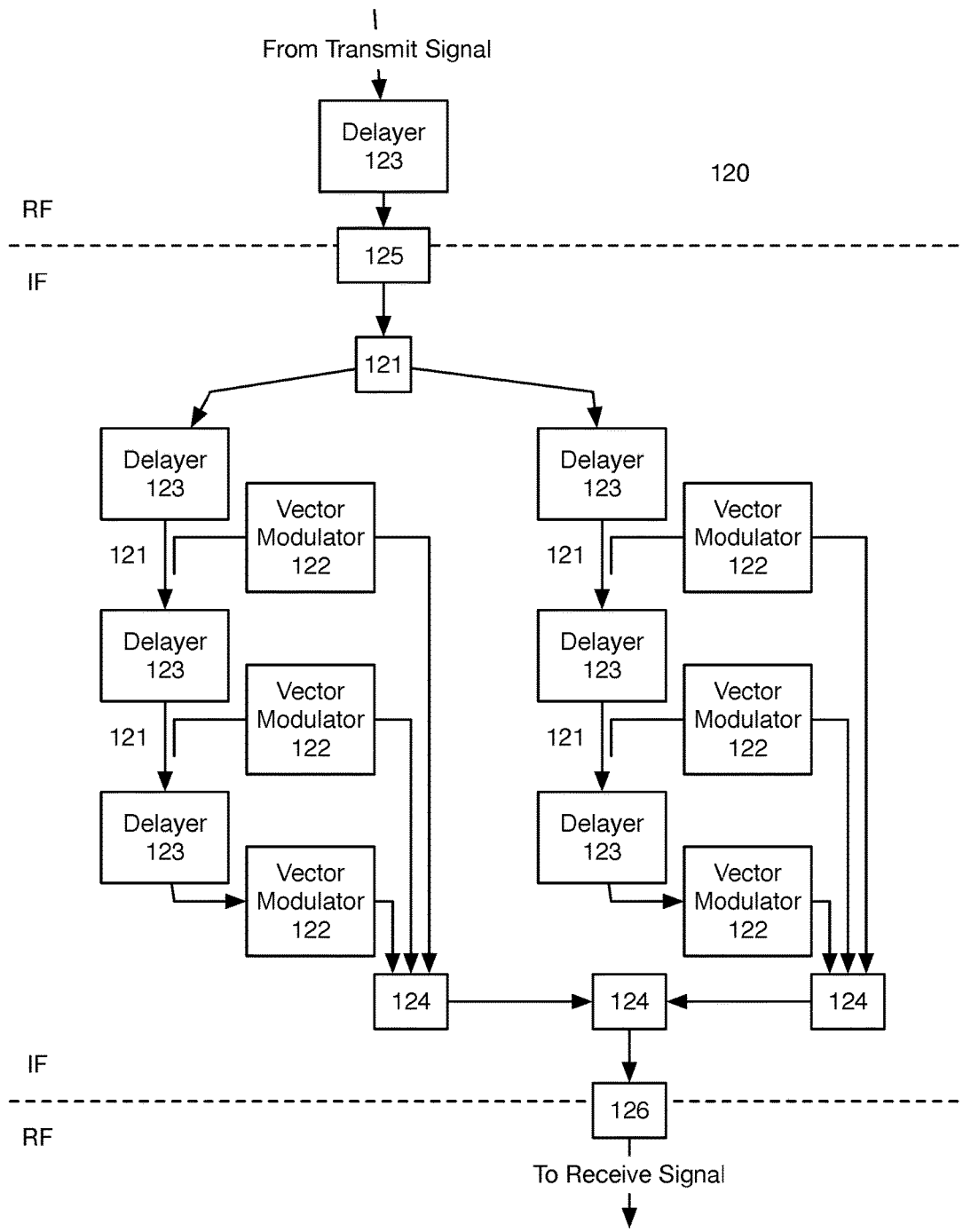
FIG. 8A is a schematic view of an analog self-interference canceller of a system of an invention embodiment.
Figure 8B:
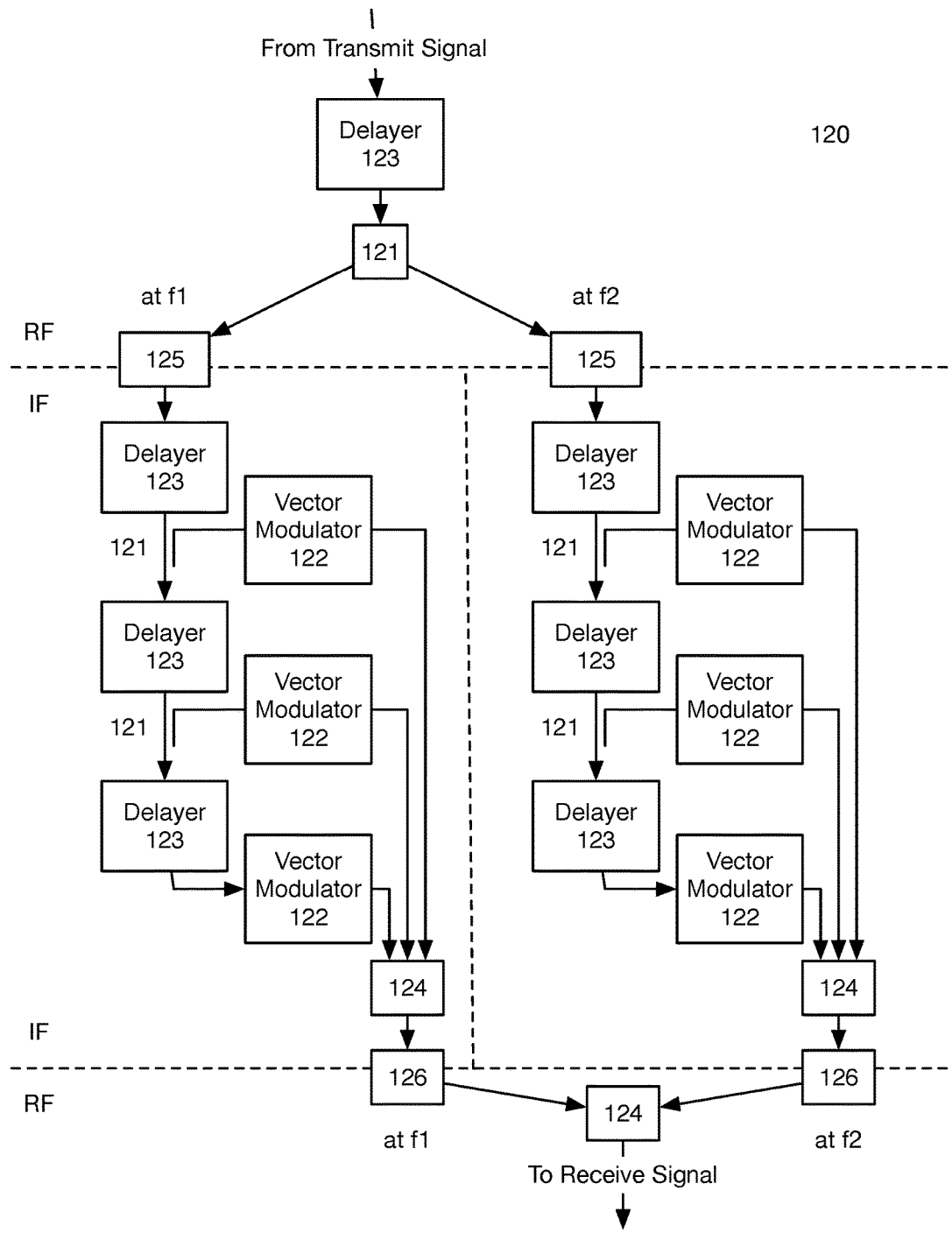
FIG. 8B is a schematic view of an analog self-interference canceller of a system of an invention embodiment.

As previously mentioned, the analog self-interference canceller 120 can perform self-interference cancellation at either or both of IF or RF bands. If the analog self-interference canceller 120 performs cancellation at IF bands, the analog self-interference canceller 120 preferably includes a downconverter 125 and an upconverter 126, as shown in FIGS. 7, 8A, and 8B. Note that as shown in FIG. 7, the entire canceller 120 may be in the IF domain; while alternatively, as shown in FIGS. 8A and 8B, some aspects of the canceller 120 (e.g., the first delayer 123) may be in the RF domain. Note further that the analog self-interference canceller 120 may include separate frequency converters operating at different frequencies, as shown in FIG. 8B. In such an implementation, different signal paths may be used to process different RF frequency bands simultaneously. The canceller 120 may feature any components operating at any frequency bands. Note that delays at RF frequency may be desirable for maintaining a high level of accuracy of the delayed signal, while IF or optical delays may provide benefits in accommodating more flexible frequency use and wider bandwidths with a smaller area. Delaying may be performed at any frequency in any scenario, however.

The downconverter 125 functions to downconvert the carrier frequency of an RF transmit signal component to an intermediate frequency (or, in some cases, baseband (IF=0 Hz)) preparing it for transformation by the analog canceller 120. The downconverter 125 is preferably substantially similar to the downconverter of the receiver (although details such as LO frequency, linearity and filter configuration can differ between the two), but can additionally or alternatively be any suitable frequency downconverter. Alternatively downconverters 125 may be used for any signal downconversion.

The upconverter 126 functions to upconvert the carrier frequency of the IF self-interference cancellation signal (received from the analog canceller 140) to a radio frequency, preparing it for combination with the RF receive signal at the receiver. The upconverter 26 is preferably communicatively coupled to the receiver and the analog canceller 120, and preferably receives IF self-interference cancellation signals from the analog canceller 120, upconverts the signal to a radio frequency, and passes the resulting RF self-interference cancellation signal to the receiver. Alternatively upconverters 126 may be used for any signal upconversion.

Amplifiers 127 may be transistor amplifiers, vacuum tube amplifiers, op-amps, or any other suitable type of amplifier.

The digital self-interference canceller 130 functions to produce a digital self-interference cancellation signal from a digital transmit signal. The digital self-interference cancellation signal is preferably converted to an analog self-interference cancellation signal (by a DAC) and combined with the analog self-interference cancellation signals to further reduce self-interference present in the RF receive signal at the receiver 110. Additionally or alternatively, the digital self-interference cancellation signal can be combined with a digital receive signal.

The digital self-interference canceller 130 preferably samples the RF transmit signal of the transmitter using an ADC (additionally or alternatively, the canceller 130 can sample the digital transmit signal or any other suitable transmit signal) and transforms the sampled and converted RF transmit signal to a digital self-interference signal based on a digital transform configuration. The digital transform configuration preferably includes settings that dictate how the digital self-interference canceller 130 transforms the digital transmit signal to a digital self-interference signal (e.g. coefficients of a generalized memory polynomial used to transform the transmit signal to a self-interference signal).

The digital self-interference canceller 130 can be implemented using a general-purpose processor, a digital signal processor, an application specific integrated circuit (ASIC), a field programmable gate array (FPGA) and/or any suitable processor(s) or circuit(s). The digital self-interference canceller 130 preferably includes memory to store configuration data, but can additionally or alternatively be configured using externally stored configuration data or in any suitable manner. In one implementation, the digital self-interference canceller 130 is substantially similar to the digital self-interference canceller of U.S. patent application Ser. No. 14/456,320, filed 11 Aug. 2014, which is incorporated in its entirety by this reference.

The digital self-interference canceller 130 can couple to transmit and receive signals in a number of ways. For example, the digital self-interference canceller 130 can use a converted RF transmit signal as input as well as provide a converted digital self-interference cancellation signal as output. As another example, the digital self-interference canceller 130 can use the digital transmit signal as input as a well as provide a digital self-interference cancellation signal as output (directly to the digital receive signal). The digital self-interference canceller can additionally or alternatively couple to transmit signals in any combination of digital and analog receive signals.

Note that while these examples reference the RF transmit signal and RF receive signal, the digital self-interference canceller 130 can additionally or alternatively couple to IF transmit signals and/or IF self-interference cancellation signals.

The controller 140 functions to control the analog self-interference canceller 120, and in particular components thereof (e.g., delayers 123, the vector modulators 122). The controller 140 can additionally or alternatively function to control any portion of the system 100 (e.g., the digital self-interference canceller 130). For example, the controller 140 may control switches or other configuration parameters of delayers 123.

In one implementation of an invention embodiment, the controller 140 analyzes reflections from a transmitted signal to characterize reflection delay times. In this implementation the controller 140 may additionally or alternatively automatically set one or more coarse delays in response to reflection analysis.

3. Self-Interference Cancellation System Configurations

Figure 9:
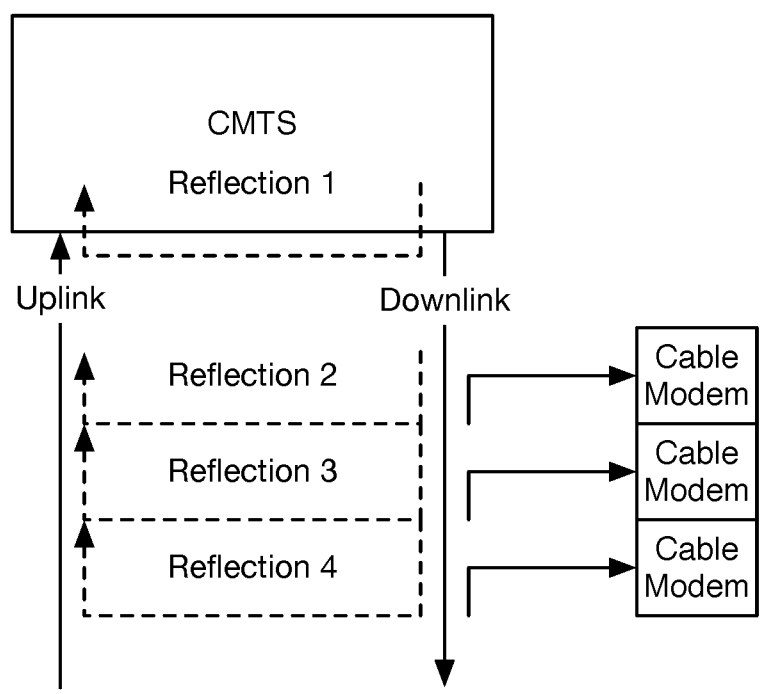
FIG. 9 is a diagram view of reflections of a CMTS distribution system.

As previously discussed, one of the considerations required for self-interference cancellation in cable communications is the unique nature of the cable channel. As shown in FIG. 9, a CMTS modem sees sparse reflections due to the coupling of cable modems to the main CMTS transmission/reception coaxial cable. For example, the first reflection (at the coupler) may have a 0 μs delay and loss of 10 dB, second reflection may have a 0.5 μs delay (i.e., it arrives at the receiver 0.5 μs after being transmitted) and a loss of 16 dB, 1.0 μs and 22 dB for the third reflection, 1.2 μs and 29 dB for the fourth reflection, and so on.

While it is possible to provide cancellation across the entire delay time, it may be overly cost or complexity prohibitive to do so. For example, to cancel over a bandwidth of 500 MHz and a reflection time of 2 μs would require 1,000 taps (assuming 2 ns delay resolution).

Figure 10:
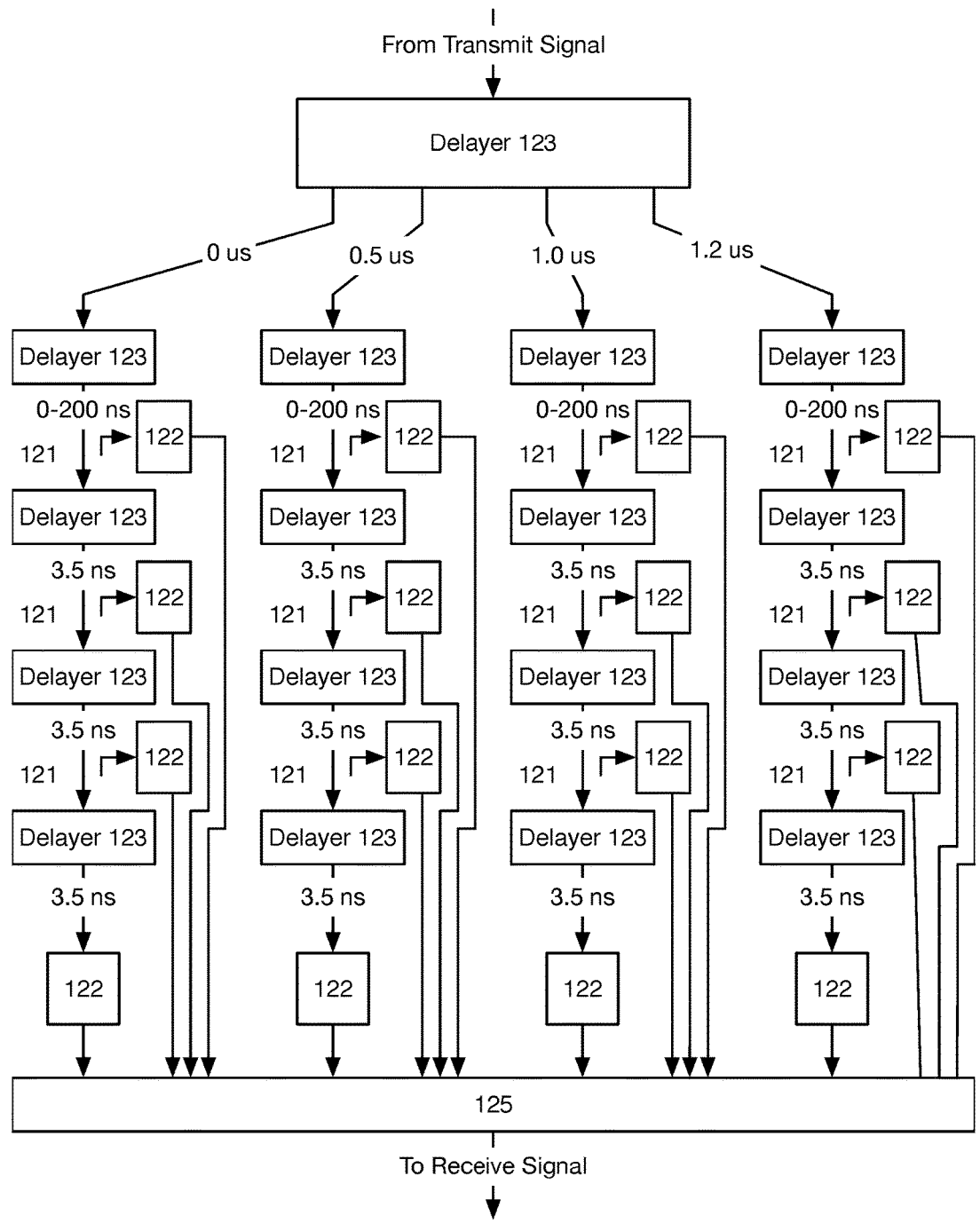
FIG. 10 is a schematic view of an analog self-interference canceller of a system of an invention embodiment.

In contrast, if some data is known about the reflections, it may be possible to perform the same level of cancellation with far fewer taps. For example, if it is known, as in the previous example, that there are four primary reflections (at 0, 0.5, 1.0, and 1.2 μs), the system 100 may include four tap groups, each with its own associated coarse delay, as shown in FIG. 10. In turn, each tap group may feature a per-tap-group variable delay of 0-200 ns, and finally, taps may have set per-tap delays (e.g., of 3.5 ns). Note that delayers 123 may be in parallel (e.g., the per-tap-group delays) or in series (e.g., the per-tap delays) or in any combination. Note that a per-tap-group delay is any delay at the beginning of a canceller tap group and is typically larger than per-tap delays (of which there may be multiple for a tap group).

The set delays of the system 100 (e.g., the delays of the first coarse delayer 123) may be set based on an analysis of signal reflections on a particular line (or some other measurement) or may be chosen based on parameters of the communications channel. For example, it may be known that drop distances between couplers corresponds to known delays, so delayer 123 values may be chosen based on drop distances between cable modem couplers on a CMTS line.

Note that delayers may be described in terms of range (specified as a difference; e.g., a 2 μs range is any delay where the minimum and maximum delay values are separated by 2 μs, a 0-2 μs delay is a delay where the minimum delay is 0 μs and the maximum delay is 2 μs) and/or delay step (for a discretely variable delay, the difference between incrementally modified delays; e.g., a 0-2 μs delay with 200 ns steps might be tunable to delays of 0, 200 ns, 400 ns . . . 1800 ns, 2000 ns).

Figure 11A:
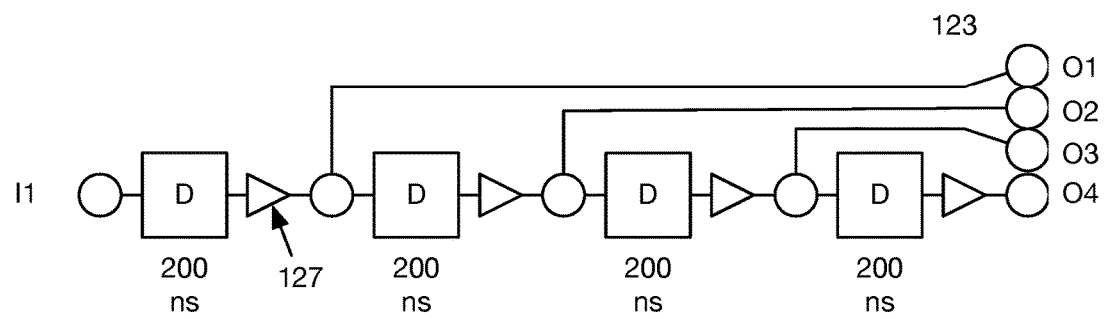
FIG. 11A is a schematic view of a delayer of a system of an invention embodiment.

In one implementation of an invention embodiment, a coarse delayer 123 may feature a chain of amplified delays (e.g., delay blocks alternated with amplifiers 127), as shown in FIG. 11A. In the example as shown in FIG. 11A, the delayer 123 has a first input (I1) and four outputs (O1, a 200 ns delay; O2, a 400 ns delay; O3, a 600 ns delay; and O4, an 800 ns delay). This implementation of the delayer 123 may be useful as a delayer 123 positioned before a plurality of delay chains (e.g., the topmost delayer 123 as shown in FIG. 10).

Figure 11B:
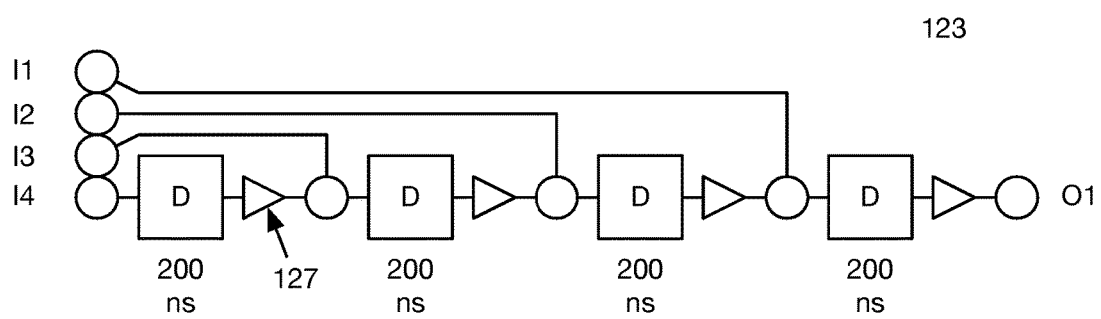
FIG. 11B is a schematic view of a delayer of a system of an invention embodiment.

As another example, the delayer 123 may feature a set of multiple inputs. In the example as shown in FIG. 11B, the delayer 123 has a single output (O1) and four inputs (I1, a 200 ns delay; I2, a 400 ns delay; I3, a 600 ns delay; and I4, an 800 ns delay). This implementation of the delayer 123 may be useful as a delayer 123 positioned after a plurality of delay chains. Delay outputs and inputs may be generally referred to as delay coupling points. In an optimized implementation, the delay coupling points could be incorporated within the delay structure for reduced area and lower loss in the circuit. Similarly, the delay coupling may also be integrated into the amplifier structure.

The delayer 123 may have any number of signal inputs and/or outputs and may split and/or combine signal components in any manner.

Figure 12:
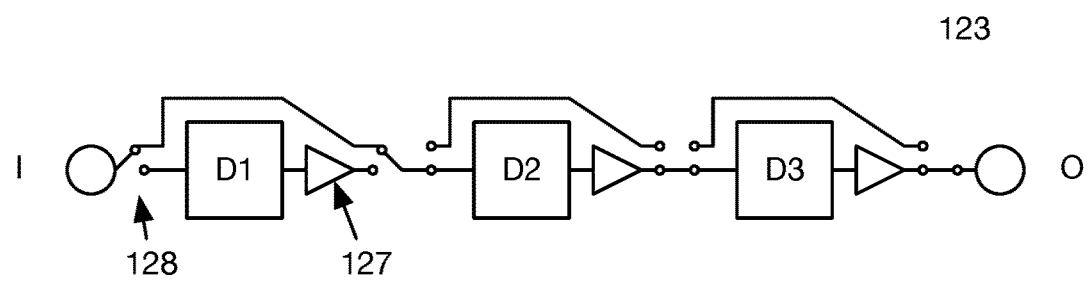
FIG. 12 is a schematic view of a delayer of a system of an invention embodiment.

In one implementation, a per-tap-group delayer 123 may feature a set of bypassable delay blocks, as shown in FIG. 12 (in this case, enabled by switches 128 that switch between a delay block and a bypass). In this implementation, the positions of switches 128 may be used to determine the delay between input and output of the delayer 123. Similarly to the previous delayer 123 example, delay blocks may have uniform values; alternatively, delay blocks may have any value. For example, a per-tap-group delayer 123 of this structure may feature delay block values of 128 ns, 64 ns, 32 ns, 16 ns, 8 ns, and 4 ns (binary encoding); this delayer may be set to 64 different values from 0 ns to 252 ns.

Delayers 123 may additionally or alternatively be configured/coded in any way (e.g., thermometer coding, hybrid thermometer coding), may feature any number of delay blocks of any value, any number of amplifiers 127, and/or any number of switches 128. For example, a delayer 123 may be binary encoded; that is, the delayer may have a base step (e.g., 6 ns) and each value in the delayer is $2^n \times 6$ ns; e.g., 6 ns, 12 ns, 24 ns, 48 ns, etc. This may be particularly useful in a chain of bypassable delay blocks, where a delay can be formed from utilization of a subset of the delay blocks.

The methods of the preferred embodiment and variations thereof can be embodied and/or implemented at least in part as a machine configured to receive a computer-readable medium storing computer-readable instructions. The instructions are preferably executed by computer-executable components preferably integrated with a system for self-interference cancellation. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A system for wired analog self-interference cancellation comprising:
- a transmit coupler, communicatively coupled to a radio frequency (RF) transmit signal of a wired communication system, that samples the RF transmit signal to create a sampled RF transmit signal having an RF carrier frequency;
- an analog-self-interference canceller comprising:
  - a frequency downconverter, comprising a mixer, a local oscillator, and an intermediate frequency (IF) filter, wherein the frequency downconverter converts, by heterodyning, the sampled RF transmit signal to a sampled IF transmit signal having an IF carrier frequency, wherein the IF carrier frequency is less than the RF carrier frequency;
  - a first coarse delayer that delays the sampled IF transmit signal by a first delay amount, resulting in a delayed sampled IF transmit signal; wherein the first coarse delayer delays the sampled IF transmit signal after frequency downconversion; and
  - a first canceller tap group comprising a first per-tap-group delayer, a first sampling coupler, a first per-tap delayer, first and second analog vector modulators, and a first combining coupler; wherein the first per-tap-group delayer further delays the delayed sampled IF transmit signal; wherein the first sampling coupler splits the delayed sampled IF transmit signal, after the first per-tap-group delayer, into first and second IF transmit signal components; wherein the first analog vector modulator generates a first IF self-interference cancellation signal component from the first IF transmit signal component; wherein the first per-tap delayer delays the second IF transmit signal component, resulting in a delayed second IF transmit signal component; wherein the second analog vector modulator generates a second IF self-interference cancellation signal component from the delayed second IF transmit signal component; wherein the first combining coupler combines the first and second IF self-interference cancellation signal components to generate an IF self-interference cancellation signal;
- a frequency upconverter comprising a mixer, a local oscillator, and an RF filter, wherein the frequency upconverter converts, by heterodyning, the IF self-interference cancellation signal to an RF self-interference cancellation signal having the RF carrier frequency; and
- a receive coupler, communicatively coupled to an RF receive signal of the wired communication system, that combines the RF self-interference cancellation signal with the RF receive signal, resulting in an RF composite receive signal; wherein the RF composite receive signal contains less self-interference than the RF receive signal.

2. The system of claim 1, wherein the first coarse delayer comprises a discretely variable surface-acoustic-wave (SAW) delayer having a range of at least 1.5 microseconds.

3. The system of claim 2, wherein the first coarse delayer has delay steps of at least 150 nanoseconds.

4. The system of claim 2, wherein the first coarse delayer comprises a chain of amplified delays in series, each amplified delay of the chain coupled to a coarse delayer coupling point; wherein delays of the first coarse delayer are varied based on selection of first delayer coupling points.

5. The system of claim 4, wherein the first per-tap-group delayer comprises a chain of bypassable delay blocks; wherein each of the bypassable delay blocks comprises an inductor-capacitor (LC) delay and an amplifier; wherein the bypassable delay blocks are binary encoded.

6. The system of claim 5, wherein the first per-tap-group delayer has a base step of between one and ten nanoseconds.

7. The system of claim 5, wherein the first per-tap delayer has a fixed delay.

8. The system of claim 5, further comprising an analog self-interference canceller controller that adapts configuration parameters of the analog self-interference canceller based on at least one of transmit signal data, receive signal data, and environmental data; wherein the configuration parameters include tunable parameters of the first and second analog vector modulators and bypass settings of the first per-tap-group delayer.

9. The system of claim 8, wherein the selection of first delayer coupling points is set based on measured drop distances between cable modem couplers coupled to the system.

10. The system of claim 8, wherein the selection of first delayer coupling points is set automatically by the analog self-interference canceller controller based upon analysis of primary reflections observed at the system.

11. A system for wired analog self-interference cancellation comprising:
- a transmit coupler, communicatively coupled to a radio frequency (RF) transmit signal of a wired communication system, that samples the RF transmit signal to create a sampled RF transmit signal having an RF carrier frequency;
- an analog-self-interference canceller comprising:
  - a frequency downconverter, comprising a mixer, a local oscillator, and an intermediate frequency (IF) filter, wherein the frequency downconverter converts, by heterodyning, the sampled RF transmit signal to a sampled IF transmit signal having an IF carrier frequency, wherein the IF carrier frequency is less than the RF carrier frequency;
  - a first coarse delayer that generates a first delayed sampled IF transmit signal by delaying the sampled IF transmit signal by a first delay amount and generates a second delayed sampled IF transmit signal by delaying the sampled IF transmit signal by a second delay amount; wherein the second delay amount is greater than the first delay amount; wherein the first coarse delayer generates delayed sampled IF transmit signals after frequency downconversion;
  - a first canceller tap group comprising a first per-tap-group delayer, a first sampling coupler, a first per-tap delayer, and first and second analog vector modulators; wherein the first per-tap-group delayer further delays the first delayed sampled IF transmit signal; wherein the first sampling coupler splits the first delayed sampled IF transmit signal, after the first per-tap-group delayer, into first and second IF transmit signal components; wherein the first analog vector modulator generates a first IF self-interference cancellation signal component from the first IF transmit signal component; wherein the first per-tap delayer delays the second IF transmit signal component, resulting in a delayed second IF transmit signal component; wherein the second analog vector modulator generates a second IF self-interference cancellation signal component from the delayed second IF transmit signal component;

a second canceller tap group comprising a second per-tap-group delayer, a second sampling coupler, a second per-tap delayer, and third and fourth analog vector modulators; wherein the second per-tap-group delayer further delays the second delayed sampled IF transmit signal; wherein the second sampling coupler splits the second delayed sampled IF transmit signal, after the second per-tap-group delayer, into third and fourth IF transmit signal components; wherein the third analog vector modulator generates a third IF self-interference cancellation signal component from the third IF transmit signal component; wherein the second per-tap delayer delays the fourth IF transmit signal component, resulting in a delayed fourth IF transmit signal component; wherein the fourth analog vector modulator generates a fourth IF self-interference cancellation signal component from the delayed fourth IF transmit signal component; and a combining coupler that combines the first, second, third, and fourth IF self-interference cancellation signal components to generate an IF self-interference cancellation signal;

a frequency upconverter comprising a mixer, a local oscillator, and an RF filter, wherein the frequency upconverter converts, by heterodyning, the IF self-interference cancellation signal to an RF self-interference cancellation signal having the RF carrier frequency; and a receive coupler, communicatively coupled to an RF receive signal of the wired communication system, that combines the RF self-interference cancellation signal with the RF receive signal, resulting in an RF composite receive signal; wherein the RF composite receive signal contains less self-interference than the RF receive signal.

12. The system of claim 11, wherein the combining coupler combines the first and second IF self-interference cancellation signal components to form a first IF self-interference cancellation signal super-component; wherein the combining coupler combines the third and fourth IF self-interference cancellation signal components to form a second IF self-interference cancellation signal super-component; wherein the combining coupler generates the IF self-interference cancellation signal by combining the first and second IF self-interference cancellation signal super-components.

13. The system of claim 11, wherein the first coarse delayer comprises a chain of delays in series, each delay of the chain coupled to coarse delayer coupling points; wherein delays of the first coarse delayer are varied based on selection of the delayer coupling points.

14. The system of claim 13, wherein the first coarse delayer takes the sampled IF transmit signal as input at a first coarse delayer coupling point, outputs the first delayed sampled IF transmit signal at a second delayer coupling point, and outputs the second delayed sampled IF transmit signal at a third delayer coupling point; wherein the third delayer coupling point is farther along the chain of delays than the second delayer coupling point.

15. The system of claim 14, wherein the second and third delayer coupling points are amplified by amplifiers of the first coarse delayer.

16. A system for wired analog self-interference cancellation comprising:

a transmit coupler, communicatively coupled to a radio frequency (RF) transmit signal of a wired communication system, that samples the RF transmit signal to create a sampled RF transmit signal having an RF carrier frequency;

an analog-self-interference canceller comprising:
a frequency downconverter, comprising a mixer, a local oscillator, and an intermediate frequency (IF) filter, wherein the frequency downconverter converts, by heterodyning, the sampled RF transmit signal to a sampled IF transmit signal having an IF carrier frequency, wherein the IF carrier frequency is less than the RF carrier frequency;

a sampling coupler that splits the sampled IF transmit signal into first and second sampled IF transmit signals;

a first canceller tap group comprising a first per-tap-group delayer, a first sampling coupler, a first per-tap delayer, first and second analog vector modulators, and a first coupling combiner; wherein the first per-tap-group delayer delays the first sampled IF transmit signal; wherein the first sampling coupler splits the first sampled IF transmit signal, after the first per-tap-group delayer, into first and second IF transmit signal components; wherein the first analog vector modulator generates a first IF self-interference cancellation signal component from the first IF transmit signal component; wherein the first per-tap delayer delays the second IF transmit signal component, resulting in a delayed second IF transmit signal component; wherein the second analog vector modulator generates a second IF self-interference cancellation signal component from the delayed second IF transmit signal component; wherein the first combining coupler combines the first and second IF self-interference cancellation signal components to generate a first IF self-interference cancellation signal super-component;

a second canceller tap group comprising a second per-tap-group delayer, a second sampling coupler, a second per-tap delayer, third and fourth analog vector modulators, and a second combining coupler; wherein the second per-tap-group delayer delays the second sampled IF transmit signal; wherein the second sampling coupler splits the second sampled IF transmit signal, after the second per-tap-group delayer, into third and fourth IF transmit signal components; wherein the third analog vector modulator generates a third IF self-interference cancellation signal component from the third IF transmit signal component; wherein the second per-tap delayer delays the fourth IF transmit signal component, resulting in a delayed fourth IF transmit signal component; wherein the fourth analog vector modulator generates a fourth IF self-interference cancellation signal component from the delayed fourth IF transmit signal component; wherein the second combining coupler combines the third and fourth IF self-interference cancellation signal components to generate a second IF self-interference cancellation signal super-component;

a first coarse delayer that delays the first IF self-interference cancellation signal super-component by a first delay amount, delays the second IF self-interference cancellation signal super-component by a second delay amount, and combines the first and second IF self-interference cancellation signal super-components to generate an IF self-interference cancellation signal; wherein the second delay amount is greater than the first delay amount;

a frequency upconverter comprising a mixer, a local oscillator, and an RF filter, wherein the frequency upconverter converts, by heterodyning, the IF self-interference cancellation signal to an RF self-interference cancellation signal having the RF carrier frequency; and a receive coupler, communicatively coupled to an RF receive signal of the wired communication system, that combines the RF self-interference cancellation signal with the RF receive signal, resulting in an RF composite receive signal; wherein the RF composite receive signal contains less self-interference than the RF receive signal.

17. The system of claim 16, wherein the first coarse delayer comprises a chain of delays in series, each delay of the chain coupled to coarse delayer coupling points; wherein delays of the first coarse delayer are varied based on selection of the coarse delayer coupling points.

18. The system of claim 17, wherein the first coarse delayer takes the first IF self-interference cancellation signal super-component as input at a first coarse delayer coupling point, takes the second IF self-interference cancellation signal super-component as input at a second coarse delayer coupling point, and outputs the IF self-interference cancellation signal at a third delayer coupling point; wherein the first delayer coupling point is between the second and third coupling points along the chain of delays.

19. The system of claim 18, wherein the selection of the coarse delayer coupling points is set based on measured drop distances between cable modem couplers coupled to the system.

20. The system of claim 18, wherein the selection of coarse delayer coupling points is set automatically by an analog self-interference canceller controller based upon analysis of primary reflections observed at the system.

* * * * *